(12) United States Patent
Yamada et al.

(10) Patent No.: US 8,291,482 B2
(45) Date of Patent: *Oct. 16, 2012

(54) SYSTEM FOR RESTRICTING CONTENT ACCESS AND STORAGE

(75) Inventors: Kazuhiro Yamada, Yokohama (JP); Tatsuaki Wakabayashi, Yokohama (JP); Hisatoshi Eguchi, Yokosuka (JP); Fumiaki Miura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 12/626,585

(22) Filed: Nov. 25, 2009

(65) Prior Publication Data
US 2010/0071037 A1 Mar. 18, 2010

Related U.S. Application Data

(63) Continuation of application No. 10/314,520, filed on Dec. 9, 2002, now Pat. No. 7,650,630.

(30) Foreign Application Priority Data

Dec. 25, 2001 (JP) .................................. 2001-392068
Aug. 7, 2002 (JP) .................................. 2002-230150

(51) Int. Cl.
G06F 7/04 (2006.01)
G06F 11/30 (2006.01)
H04L 29/06 (2006.01)
H04L 9/32 (2006.01)
H04M 1/66 (2006.01)

(52) U.S. Cl. .................... 726/9; 726/2; 726/20; 726/26; 726/30; 713/160; 713/165; 713/169; 713/193; 455/410

(58) Field of Classification Search .................... 726/30, 726/2, 9, 20, 26; 713/165, 160, 169, 193; 455/410
See application file for complete search history.

(56) References Cited

U.S. PATENT DOCUMENTS

| 5,282,247 | A | | 1/1994 | McLean et al. .................... 380/4 |
| 5,933,773 | A | | 8/1999 | Barvesten ....................... 455/411 |
| 6,012,143 | A | * | 1/2000 | Tanaka ............................ 726/20 |
| 6,034,925 | A | * | 3/2000 | Wehmeyer ................. 369/30.28 |
| 6,047,071 | A | | 4/2000 | Shah ............................. 380/273 |

(Continued)

FOREIGN PATENT DOCUMENTS

EP 0 607 767 B1 11/1997
(Continued)

OTHER PUBLICATIONS

Tsutao Nishizaki, "Card v. Mobile Phone: Next-Generation Mobile Phone and SIM," CardWave, pp. 30-33, Mar. 2001 (4 pgs.); (with Concise Explanation of Document in English, 1 pg.).

(Continued)

*Primary Examiner* — Mohammad W Reza
(74) *Attorney, Agent, or Firm* — Brinks Hofer Gilson & Lione

(57) ABSTRACT

UIMID of a UIM 50 owned by the owner of a portable phone 40 is stored in an owner information registration area 410b of phone 40. A CPU 405 of portable phone 40, upon receiving content, compares a UIMID of a UIM 50 inserted in phone 40 to the UIMID registered in owner information registration area 410b. The storing of the content in a nonvolatile memory 410 is permitted only when the two UIMIDs agree with each other.

23 Claims, 30 Drawing Sheets

U.S. PATENT DOCUMENTS

| | | | | |
|---|---|---|---|---|
| 6,091,946 | A | 7/2000 | Ahvenainen | 455/411 |
| 6,173,172 | B1 | 1/2001 | Masuda et al. | 455/410 |
| 6,212,372 | B1 | 4/2001 | Julin | 455/418 |
| 6,236,859 | B1 | 5/2001 | Morper | 455/435 |
| 6,314,409 | B2 | 11/2001 | Schneck et al. | 705/54 |
| 6,320,947 | B1 | 11/2001 | Joyce et al. | 379/144 |
| 6,342,010 | B1 | 1/2002 | Slifer | 463/39 |
| 6,381,316 | B2 | 4/2002 | Joyce et al. | 379/114.2 |
| 6,445,914 | B1 | 9/2002 | Findikli et al. | 455/411 |
| 6,473,742 | B1 * | 10/2002 | Sager | 705/51 |
| 6,501,962 | B1 | 12/2002 | Green | 455/558 |
| 6,574,594 | B2 * | 6/2003 | Pitman et al. | 704/236 |
| 6,633,764 | B1 | 10/2003 | Garcia | 455/466 |
| 6,721,488 | B1 * | 4/2004 | Dimitrova et al. | 386/241 |
| 6,810,479 | B1 | 10/2004 | Barlow et al. | 713/185 |
| 6,834,346 | B1 * | 12/2004 | Ishibashi et al. | 713/179 |
| 6,871,063 | B1 | 3/2005 | Schiffer | 455/410 |
| 6,886,017 | B1 * | 4/2005 | Jackson et al. | 1/1 |
| 6,975,855 | B1 | 12/2005 | Wallenius | 455/417 |
| 6,999,948 | B1 | 2/2006 | Hatanaka et al. | 705/65 |
| 7,006,995 | B1 * | 2/2006 | Edenson et al. | 705/51 |
| 7,076,463 | B1 * | 7/2006 | Boies et al. | 705/39 |
| 7,130,648 | B1 | 10/2006 | Fournier et al. | 455/466 |
| 7,143,143 | B1 * | 11/2006 | Thompson | 709/217 |
| 7,248,886 | B1 | 7/2007 | Ljungstroem et al. | 455/465 |
| 7,349,697 | B2 | 3/2008 | Onaka et al. | 455/435.1 |
| 7,437,768 | B2 * | 10/2008 | Kawakami et al. | 726/26 |
| 7,650,630 | B2 | 1/2010 | Yamada et al. | |
| 7,848,780 | B2 | 12/2010 | Washio et al. | 455/558 |
| 2001/0037378 | A1 * | 11/2001 | Hirayama | 709/219 |
| 2002/0099665 | A1 | 7/2002 | Burger et al. | 705/67 |
| 2004/0073580 | A1 | 4/2004 | Nakayama et al. | 707/201 |
| 2004/0133794 | A1 | 7/2004 | Kocher et al. | 713/193 |
| 2007/0197201 | A1 | 8/2007 | Washio et al. | 455/418 |

FOREIGN PATENT DOCUMENTS

| | | |
|---|---|---|
| EP | 1047277 A2 | 10/2000 |
| EP | 1085395 A2 | 3/2001 |
| EP | 1107627 A1 | 6/2001 |
| EP | 1143688 A1 | 10/2001 |
| GB | 2369205 B | 2/2005 |
| JP | H08-065740 | 3/1996 |
| JP | H09-023268 | 1/1997 |
| JP | H09-322239 | 12/1997 |
| JP | H11-191804 | 7/1999 |
| JP | H11-306118 | 11/1999 |
| JP | 2000-049687 | 2/2000 |
| JP | 2000-099187 | 4/2000 |
| JP | 2002-100116 | 4/2002 |
| JP | 2002-135407 A | 5/2002 |
| JP | 2003-198718 | 7/2003 |
| JP | 2005-086253 | 3/2005 |
| KR | 2001-0043378 | 5/2001 |
| WO | WO 97/44762 | 11/1997 |
| WO | WO 99/57843 | 11/1999 |
| WO | WO 00/48416 | 8/2000 |
| WO | WO 00/59225 | 10/2000 |
| WO | WO 03/040930 A1 | 5/2003 |

OTHER PUBLICATIONS

Microsoft Outlook 98, http://support.microsoft.com/?kibd-181005, 2 pgs. Of English version, 3 pgs. Of Japanese version, Jul. 30, 2001.

Republic of the Philippines Intellectual Property Official Gazette, vol. VII, No. 5, Aug. 18, 2004, regarding Philippines Patent Application No. 1-2002-00861, 3 pgs. (In English).

Search Report and Written Opinion dated Dec. 13, 2004, issued in Singapore Patent Application No. 200207356-7, 9 pgs. (In English).

European Search Report dated Jun. 9, 2005, issued in European Patent Application No. 02028128, 3 pgs. (In English).

Japanese Office Action dated Sep. 11, 2007, for corresponding Japanese Patent Application No. 2001-392068, (2 pgs. Japanese, 3 pgs. English translation).

Office Action dated Jan. 14, 2008, issued in Norwegian Patent Application No. 20026210, 6 pgs. (3 pgs. Norwegian, 3 pgs. English translation).

India Office Action dated Sep. 30, 2009, issued in corresponding India Patent Application No. 62/KOL/2005 (6 pgs.).

Office Action mailed Feb. 3, 2009, in U.S. Patent Publication No. 2007/0197201 A1, U.S. Appl. No. 10/583,622.

Office Action mailed Aug. 18, 2009, in U.S. Patent Publication No. 2007/0197201 A1, U.S. Appl. No. 10/583,622.

Office Action mailed Oct. 21, 2009, in U.S. Patent Publication No. 2007/0197201 A1, U.S. Appl. No. 10/583,622.

Office Action mailed May 26, 2006, in U.S. Patent No. 7,650,630 B2, U.S. Appl. No. 10/314,520.

Office Action mailed Feb. 27, 2007, in U.S. Patent No. 7,650,630 B2, U.S. Appl. No. 10/314,520.

Office Action mailed Nov. 16, 2007, in U.S. Patent No. 7,650,630 B2, U.S. Appl. No. 10/314,520.

Office Action mailed May 28, 2008, in U.S. Patent No. 7,650,630 B2, U.S. Appl. No. 10/314,520.

Office Action mailed Nov. 3, 2008, in U.S. Patent No. 7,650,630 B2, U.S. Appl. No. 10/314,520.

Notice of Allowance mailed Apr. 30, 2009, in U.S. Patent No. 7,650,630 B2, U.S. Appl. No. 10/314,520.

Notice of Allowance mailed Aug. 21, 2009, in U.S. Patent No. 7,650,630 B2, U.S. Appl. No. 10/314,520.

* cited by examiner

FIG. 20

| ITEM NAME | MANDATORY/OPTIONAL | DATA |
|---|---|---|
| AppName | MANDATORY | |
| AppVer | OPTIONAL | |
| PackageURL | MANDATORY | |
| AppSize | OPTIONAL | |
| ⋮ | ⋮ | ⋮ |
| Spsize | OPTIONAL | |
| AppUser | OPTIONAL | |

FIG. 23

SELECT Java AP

PLEASE SELECT Java AP
TO EXECUTE

[1] PROGRAM FOR BANK A
[2] PROGRAM FOR CARD B
[3] PROGRAM FOR ONLINE
    TRADING
[4] GAME PROGRAM 1
[5] GAME PROGRAM 2
[6] GAME PROGRAM 3

⋮

[9] GO TO NEXT PAGE

SYSTEM FOR RESTRICTING CONTENT ACCESS AND STORAGE

This application is a continuation of U.S. patent application Ser. No. 10/314,520, filed Dec. 9, 2002, now U.S. Pat. No. 7,650,630 and claims, under 35 U.S.C. §119, the benefit of priority of the filing date of Aug. 7, 2002 of Japanese patent application Serial Number JP 2002-230150, and the benefit of priority of the filing date of Dec. 25, 2001 of Japanese patent application, Serial Number JP 2001-392068 all of which are incorporated herein by reference in their entirety.

TECHNICAL FIELD

The present invention relates to a communication device and method used for restricting access to and storage of content, the communication device comprising a data storage module interface for communicating with a data storage module.

BACKGROUND ART

A well-known portable phone having a packet communications function is capable of downloading content such as image data, music data, movie data, programs (e.g. Java™ application programs), and the like from a content provider in a network.

A new type of a portable phone has been developed recently, as disclosed in JP 2002-135407, such a phone being equipped with a data storage module (hereinafter referred to as a UIM (User Identity Module)), and subscriber information being stored in the UIM instead of in the memory of the phone itself. In a UIM, personal information of a user such as the user's credit card number, bank account number, telephone directory, and the like are stored in addition to the subscriber information. A user can remove a UIM from his/her own portable phone and insert the UIM into a portable phone owned by a third person, to thereby use the portable phone owned by the third person as if it were his/her own phone. Thus, a user is able to engage in voice and/or packet communication using a third person's portable phone by inserting his/her own UIM into the third person's phone, since information unique to each user (subscriber information and personal information described above) is stored in a UIM owned by respective users and transferred to any connected portable phone to effect voice and/or packet communication. In this case, communication charges incurred by voice and/or packet communication are billed to a user identified according to subscriber information stored in a UIM, not to the owner of a portable phone.

In a case that a user of a UIM downloads content from a content provider, access to the downloaded content is usually restricted to the user because s/he is the only person authorized by the content provider on the basis of satisfying certain conditions, for example, paying monthly charges for using application software. Ideally, a UIM would be used to store in addition to user ID and the like a substantial amount of downloaded content. However, the physical limitations of a UIM card prevent such storage, and it is feasible to store only a small amount of such information in a memory of the UIM. Thus, it is necessary to store most downloaded content in a memory storage space available in a portable phone into which a UIM is inserted.

However, a problem may arise in such a situation that if a user A inserts his/her own UIM into a user B's portable phone, and is able to use that phone without restriction, content downloaded by the user B can be accessed and read by the user A; or user A may write and store his/her downloaded content into user B's phone. Such usage of a third party's phone to access and/or store downloaded content may lead to a situation in which content originating at a content server, i.e., a content provider, and that is intended for and restricted to use by an authorized user is accessed and used by another, unauthorized, user.

SUMMARY OF THE INVENTION

A system is described for restricting access and storage of content that is downloaded from a content provider and stored in a nonvolatile memory of a communication device such as a portable phone, the device having a data storage module interface for communicating with a data storage module.

The system provides a communication device comprising: a nonvolatile memory storage means; a data storage module interface for communicating with any one of a plurality of data storage modules; registering means for registering, in the nonvolatile memory storage means, qualification verification information; communication means for receiving content from a network; and first determination means for determining, when content is received from a network, on the basis of the qualification verification information registered in the nonvolatile memory storage means, to permit storing of the received content in the nonvolatile memory storage means in a case that any one of the plurality of data storage modules connecting to the communication device is a data storage module which a valid user of the communication device is authorized to use. Preferably, the data storage module is a user identify module (UIM) for storing information for enabling the communication device to access a node in a network.

According to a preferred embodiment of the present invention, the communication device is further provided with second determination means for determining, when access to the stored content in the nonvolatile memory storage means is requested, on the basis of the qualification verification information registered in the nonvolatile memory storage means, that access to the stored content in the nonvolatile memory storage means is permitted in a case that any one of the plurality of data storage modules connecting to the communication device when access to the stored content is requested is a data storage module which a valid user of the communication device is authorized to use.

In another preferred embodiment according to the present invention, there is provided a communication device comprising: a nonvolatile memory storage means; a data storage module interface for communicating with any one of a plurality of data storage modules, each of the plurality of data storage modules storing access qualification information; communication means for receiving content from a network; storing means for storing, when content is received from a network, in association with the received content, access qualification information which specifies the data storage module connecting to the communication device at the time of receiving the content, in the nonvolatile memory storage means; and determination means for determining, when access to the stored content by the storing means is requested, whether to permit access to the stored content on the basis of the access qualification information stored in association with the received content.

Preferably, the determination means determines, from among one or a plurality of content sets stored in the nonvolatile memory storage means, one or more content sets corresponding to access qualification information of any one of the plurality of data storage modules connecting to the communication device at the time of determination, as access-permitted content. In this case the communication device is further provided with presenting means for presenting the access-permitted content to a user of the any one of the plurality of data storage modules connecting to the communication device at the time of determination.

Also described herein is a method for restricting content access and storage, comprising steps of performing a process by using means provided in one of the above communication devices in various embodiments. Still further, the method may be implemented not only in an embodiment of producing and selling a communication device for restricting content access and storage, but also in an embodiment of distributing to users through a telecommunication line a program for causing a network-connected computer to function as a device for restricting content access and storage, and also in an embodiment of distributing such a program recorded in a computer-readable recording medium.

Using these techniques, it becomes possible to restrict access to a nonvolatile memory in a communication device to only the owner of the communication device, thereby preventing an unauthorized user from writing or reading data into or from the nonvolatile memory of the communication device. Furthermore, access to content stored in a nonvolatile memory of a communication device can be restricted to a user who has been given permission by a content provider to download and use the content.

BRIEF DESCRIPTION OF THE DRAWINGS

FIG. 20 is a diagram illustrating a data configuration of an ADF (Application Descriptor File) according to a fourth embodiment of the present invention.

FIG. 23 is a diagram showing an example of a selection screen displayed when the selection screen display process of FIG. 11 is performed according to the fifth embodiment.

PREFERRED EMBODIMENTS OF THE INVENTION

Figure 1:
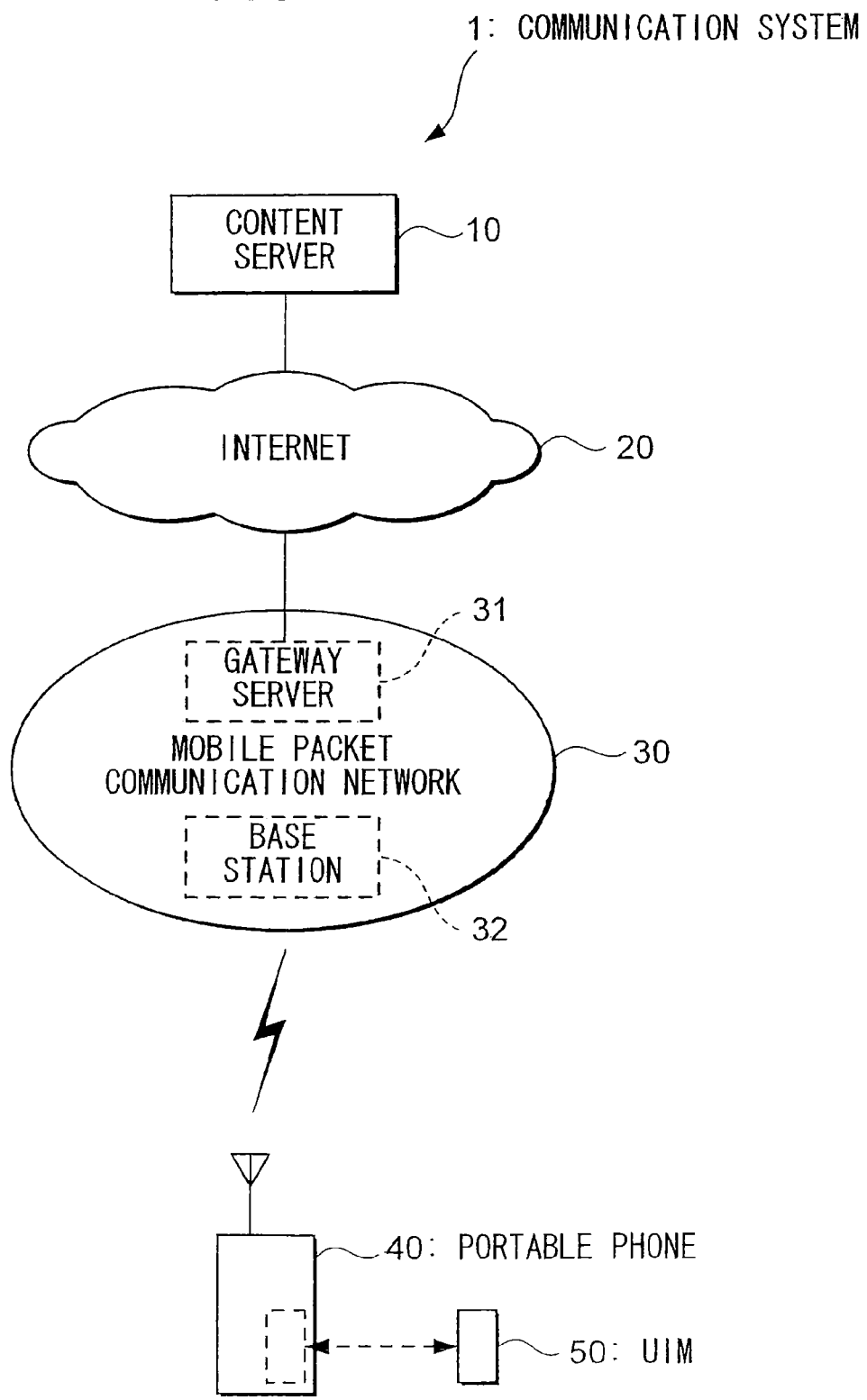
FIG. 1 is a block diagram illustrating a configuration of a communication system 1 according to a first embodiment of the present invention.

Preferred embodiments of the present invention will now be described with reference to the attached drawings. It is to be noted that like components are assigned the same reference numerals in the respective drawings.

A. First Embodiment

Configuration of First Embodiment

FIG. 1 is a block diagram illustrating a configuration of a communication system 1 according to a first embodiment of the present invention. As shown, communication system 1 comprises a content server 10, the Internet 20, a mobile packet communication network 30, a portable phone 40, and a UIM 50. It is to be noted that there are shown in FIG. 1 one portable phone 40 and one UIM 50 for the sake of simplicity. In practice, communication system 1 serves a number of portable phones 40. Also, UIM 50 is operable, being inserted in portable phone 40, and replaceable with another UIM 50. Similarly, there are shown only one of each content server 10, gateway server 31, and base station 32 in FIG. 1.

Content server 10 has a function of performing packet communications with portable phone 40 through the Internet 20 and mobile packet communication network 30. Content server 10 stores in its memory various types of content including programs, image data, music data and the like. Content stored in content server 10 can also include Java application programs (hereinafter referred to as Java AP) that can be executed in portable phone 40. Java APs include Java applets and Java applications and are application programs described in the Java programming language.

Mobile packet communication network 30 comprises gateway server 31 and base station 32 and provides a packet communication service to portable phones 40 served by network 30. Communication system 1 has, in addition to mobile packet communication network 30, a mobile telephone network (not shown). The mobile telephone network provides, with portable phones 40, a voice communication service for general mobile phones.

Gateway server 31 converts data between a communication protocol for mobile packet communication network 30 and another protocol for the Internet 20, and vice versa, and relays data exchanges between mobile packet communication network 30 and the Internet 20. Base station 32 performs wireless communications with portable phone(s) 40 located in a radio cell covered by the station 32.

Portable phone 40 performs wireless communication with base station 32, thereby receiving a packet communication service and voice communication service. Portable phone 40 performs packet communications with content server 10 through mobile packet communication network 30 and the Internet 20 to download a desired content from content server 10. Further, UIM 50 can be inserted into portable phone 40.

UIM 50 is a data storage module which can be inserted in or removed from portable phone 40, examples of which module include Java card and SIM (Subscriber Identity Module). UIM 50 executes programs with a microprocessor provided therein and is capable of performing various control operations. Further, UIM 50 stores, as subscriber information, a telephone number assigned to the same UIM 50 by a communication carrier operating mobile packet communication network 30. A telephone number is identification information for receiving a communication service provided by mobile packet communication network 30. UIM 50 stores personal information such as a credit card number, bank account number, and/or a phone directory, which information is unique to the owner of the UIM 50. Also stored in UIM 50 is a serial number (hereinafter referred to as UIMID) unique to each UIM 50.

It is to be noted that portable phone 40, if it is a type of phone 40 used with UIM 50, is not capable of performing communications through mobile packet communication network without having a UIM 50 inserted therein. In other words, in performing communication with content server 10 or another portable phone 40 through mobile packet communication network 30, portable phone 40 transmits to network 30 subscriber information (i.e. a telephone number) obtained from UIM 50 which is inserted in the phone 40, and network 30 in turn determines whether to relay communication in response to a connection request from phone 40, on the basis of authentication result with respect to subscriber information received from phone 40.

Figure 2:
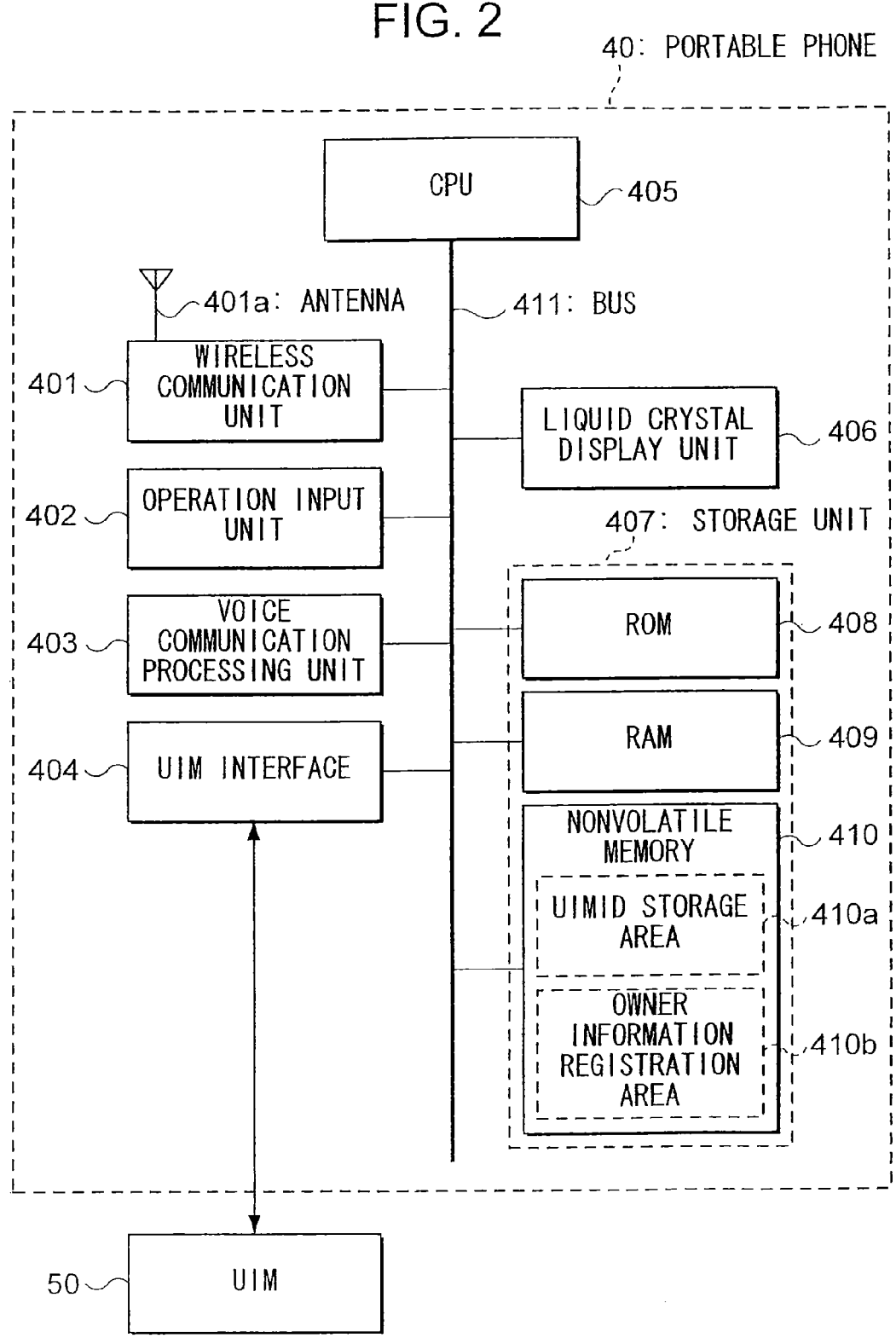
FIG. 2 is a block diagram illustrating a hardware configuration of a portable phone 40 according to the first embodiment.

FIG. 2 is a block diagram illustrating a hardware configuration of portable phone 40 shown in FIG. 1. As shown in FIG. 2, portable phone 40 comprises a wireless communication unit 401, an operation input unit 402, a voice communication processing unit 403, a UIM interface 404, CPU (Central Processing Unit) 405, a liquid crystal display unit 406, and a storage unit 407, which are connected with one another by a bus 411.

Wireless communication unit 401 has an antenna 401a and controls wireless communication with radio station 32. Wireless communication unit 401, under the control of CPU 405, generates a transmission signal by superimposing data for packet communication or data relating to voice communication on a carrier wave to forward the signal to base station 32. Wireless communication unit 401 also receives through antenna 401a a radio signal transmitted from base station 32 and demodulate the received signal to restore data for packet communication or data relating to voice communication.

Operation input unit 402 has a plurality of keys used for inputting numerals, characters, operation instructions, and the like, and outputs to CPU 405 an operation signal associated with a key operation. Voice communication processing unit 403 has, for example, a microphone, a speaker, a voice processing unit, and the like, and performs voice communication processing including connecting/disconnecting a call, under the control of CPU 405. UIM interface 404 controls communication with UIM 50 which is inserted in phone 40.

CPU 405 implements various programs stored in storage unit 407 and controls each component of phone 40 which is connected to one another thorough bus 411. Liquid crystal display unit 406 comprises a liquid crystal display panel and a driving circuit for controlling the display.

Storage unit 407 comprises a ROM 408, a RAM 409, and a nonvolatile memory 410 such as a SRAM (Static-RAM) and an EEPROM (Electrically Erasable Programmable-ROM). Stored in ROM 408 are, for example, an operating system (hereinafter referred to as OS) for portable phone 40, a web browser, and a software for building a Java runtime environment. RAM 409 is used for a work area of CPU 405.

Nonvolatile memory 410 stores various programs and data to be used in portable phone 40, including content downloaded from content server 10. Nonvolatile memory 410 comprises a UIMID storage area 410a and an owner information registration area 410b.

UIMID storage area 410a stores a UIMID of a UIM 50 which is presently inserted in portable phone 40. When UIM 50 is inserted into portable phone 40, UIMID is transmitted from UIM 50 to UIM interface 404 and stored in UIMID storage area 410a by CPU 405. When UIM 50 is removed from portable phone 40, UIMID stored in UIMID storage area 410a is deleted.

Owner information registration area 410b stores a UIMID of a UIM 50 which the owner of the portable phone 40 is authorized to use. It is to be noted here that, in the following description, the "owner of portable phone 40" includes a regular, valid user of portable phone 40 who is different from a registered owner of the phone. For example, in a case that a company employee is a regular user of portable phone 40 which belongs to the company, such a user falls in the meaning of an "owner of portable phone 40" in the description.

Figure 3:
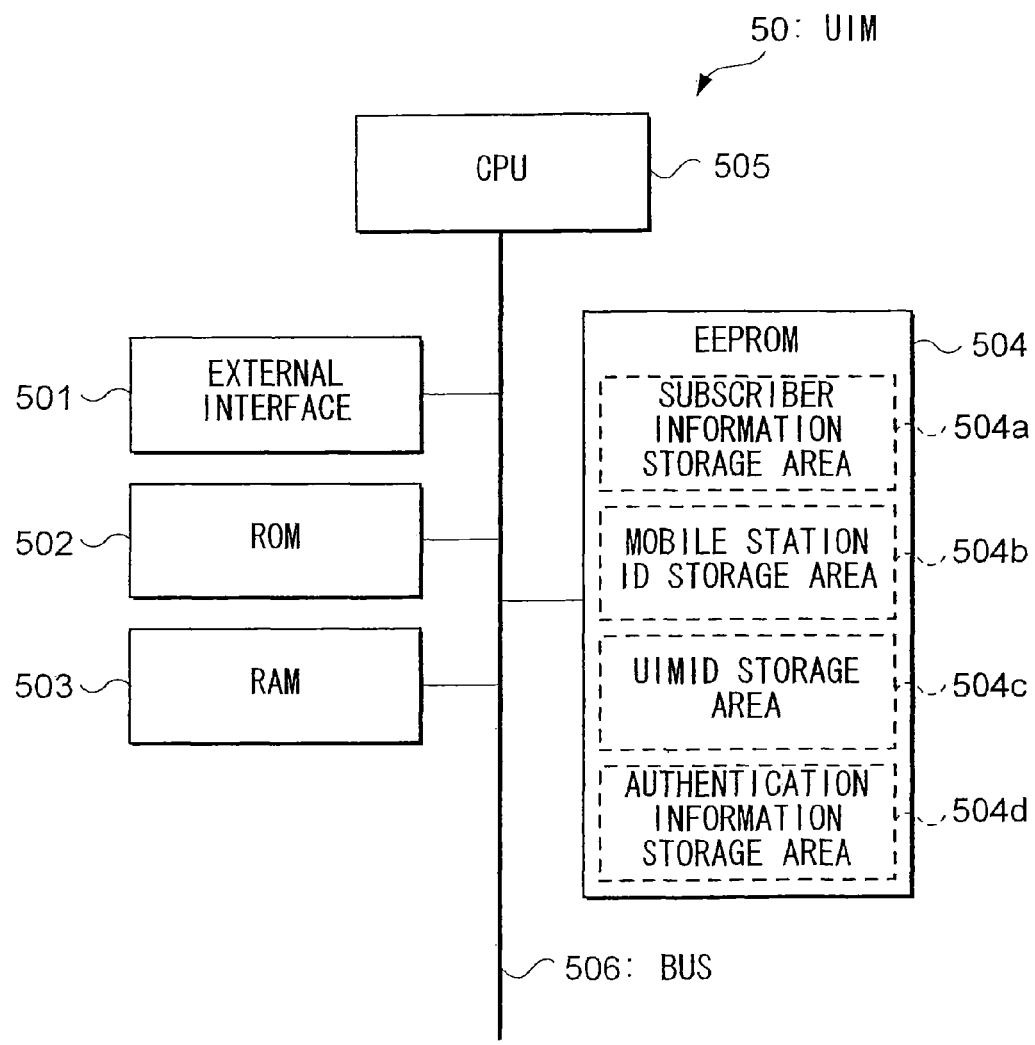
FIG. 3 is a block diagram illustrating a hardware configuration of a UIM 50 according to the first embodiment.

FIG. 3 is a block diagram illustrating a hardware configuration of UIM 50 shown in FIG. 1. As shown in FIG. 3, UIM 50 comprises an external interface 501, a ROM 502, a RAM 503, an EEPROM 504, and a CPU 505, each component being connected to one another through a bus 506.

External interface 501 controls, under the control of CPU 505, communication with portable phone 40. ROM 502 stores programs and data for controlling UIM 50. RAM 503 is used as a work area of CPU 505 and temporally stores programs and various data executed by CPU 505.

EEPROM 504 comprises a subscriber information storage area 504a, a mobile station ID storage area 504b, a UIMID storage area 504c, and an authentication information storage area 504d.

Subscriber information storage area 504a stores a telephone number assigned to UIM 50, and personal information of the owner of UIM 50 such as a credit card number, bank account number, telephone directory, and the like. In addition, a user ID assigned to the owner of the UIM 50 may be stored as identification information for identifying a valid user of UIM 50. It should be noted that the same user ID may be stored in another UIM 50 owned by the same user in a case that the user owns more than one UIMs 50.

As described above with respect to the meaning of "owner of portable phone 40," it is to be noted that an "owner of UIM 50" includes a regular, valid user of UIM 50 even when the regular user does not correspond to a registered owner of UIM 50.

Mobile station ID storage area 504b stores a mobile station ID of portable phone 40 in which UIM 50 is presently inserted. In UIMID storage area 504c, a UIMID unique to UIM 50 is stored. UIM 50 is, for example, shipped from a factory with a unique UIMID having been written into UIMID storage area 504c. Alternatively, a UIMID may be assigned and written into UIMID storage area 504c at the time of entering a communication service contract.

In authentication information storage area 504c, there is stored authentication information such as a password registered by the owner of UIM 50, the authentication information being used for authenticating the owner of UIM 50. Alternatively, in a case that portable phone 40 has a biometrics function of measuring and analyzing human body characteristics such as fingerprints, voiceprints, and the like, of the user of phone 40, biometrics information, instead of a password, may be stored as authentication information.

CPU 505 executes various programs stored in ROM 502 and EEPROM 504 to control each unit of portable phone 40. In the case that UIM 50 is inserted in portable phone 40, CPU 505 displays an input screen on a liquid crystal display screen of phone 40 to prompt the user to input a password. Then, CPU 505 compares the password just input by the user to the password registered in authentication information storage area 504d, and when the identity of the owner is verified, the user is allowed to access various information stored in each storage area 504a to 504d in EEPROM 504. Thus, it is possible to determine whether a user of portable phone 40 is a valid user of UIM 50.

Operation of First Embodiment

Figure 4:
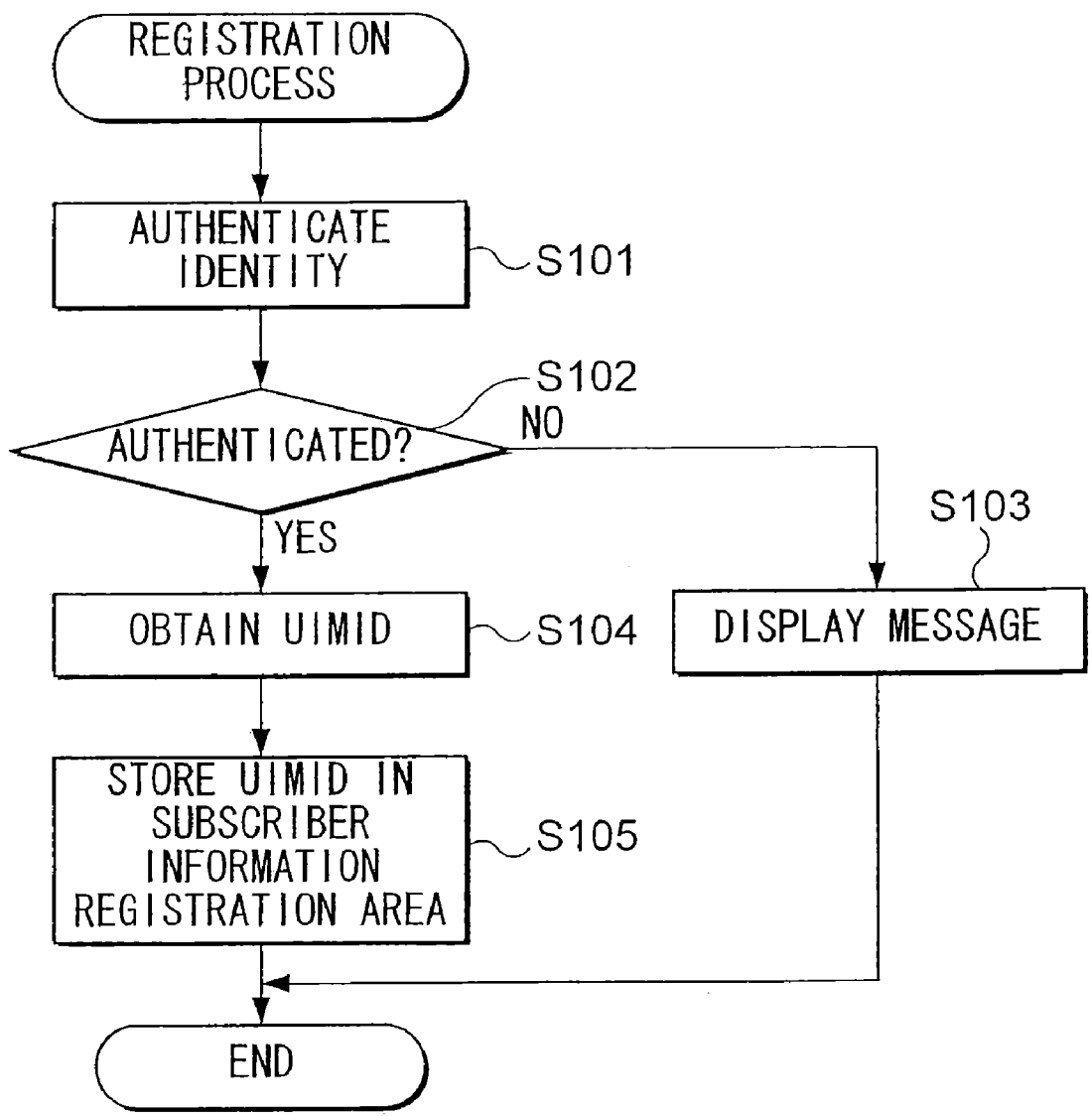
FIG. 4 is a flow chart showing a registration process performed by CPU 405 of portable phone 40 according to the first embodiment.

First, with reference to a flowchart shown in FIG. 4, an explanation will be made of a process of registering a UIMID of UIM 50 in owner information registration area 410b of portable phone 40, the owner of which UIM 50 is the same as the owner of portable phone 40.

Portable phone 40 is provided with a UIMID registration mode for registering UIMID of UIM 50 owned by the owner of phone 40. When the owner of phone 40 inserts his/her own UIM 50 into phone 40, and operates phone 40 to give instruction to carry out the UIM registration mode, CPU 405 performs the registration operation shown in FIG. 4.

In the UIMID registration mode, CPU 405 first authenticates that a user presently operating portable phone 40 is the owner of phone 40 and also is the owner of UIM 50 (Step S101). The authentication process in Step S101 includes, for example, comparing a registered password of phone 40 or UIM 50 to a password inputted by the user. The biometrics information of a user may also be used in place of a password.

When the result of the authentication operation shows that the user currently using portable phone 40 is not the owner of phone 40 or not the owner of UIM 50 which is inserted in phone 40 (Step S102: No), CPU 405 displays a message showing that the authentication is unsuccessful (Step S103), and the routine ends.

On the other hand, when the result shows that the user currently using portable phone 40 is the owner of phone 40 and also the owner of UIM 50 which is inserted in phone 40 (Step S102: Yes), CPU 405 obtains from UIM 50 inserted in phone 40 a UIMID of the UIM 50 (Step S104). In more details, CPU 405 first transmits to UIM 50 an ID transmission request for requesting the UIM 50 to transmit its own UIMID to phone 40. Upon receiving the request, CPU 505 of the UIM 50 reads UIMID from UIMID storage area 504c for transmission to phone 40.

CPU 405 of portable phone 40 then stores the transmitted UIMID in owner information registration area 410b as information for identifying UIM 50 owned by the owner of phone 40 (Step S105), and the routine is finished.

It should be noted that at the time when UIM 50 is inserted in portable phone 40, UIMID of the UIM 50 is written in UIMID storage area 410a of phone 40. Therefore, instead of requesting UIM 50 to transmit its own UIMID in Step S104, CPU 405 of portable phone 40 may read the UIMID stored in UIMID storage area 410a (Step S104) to store the read UIMID in owner information registration area 410b (Step S104).

It is also to be noted that UIMID registered in owner information registration area 410b is not limited to one UIMID. More than one UIMIDs may be registered in owner information registration area 410b in the case that the owner of portable phone 40 owns a plurality of UIMs 50.

Figure 5:
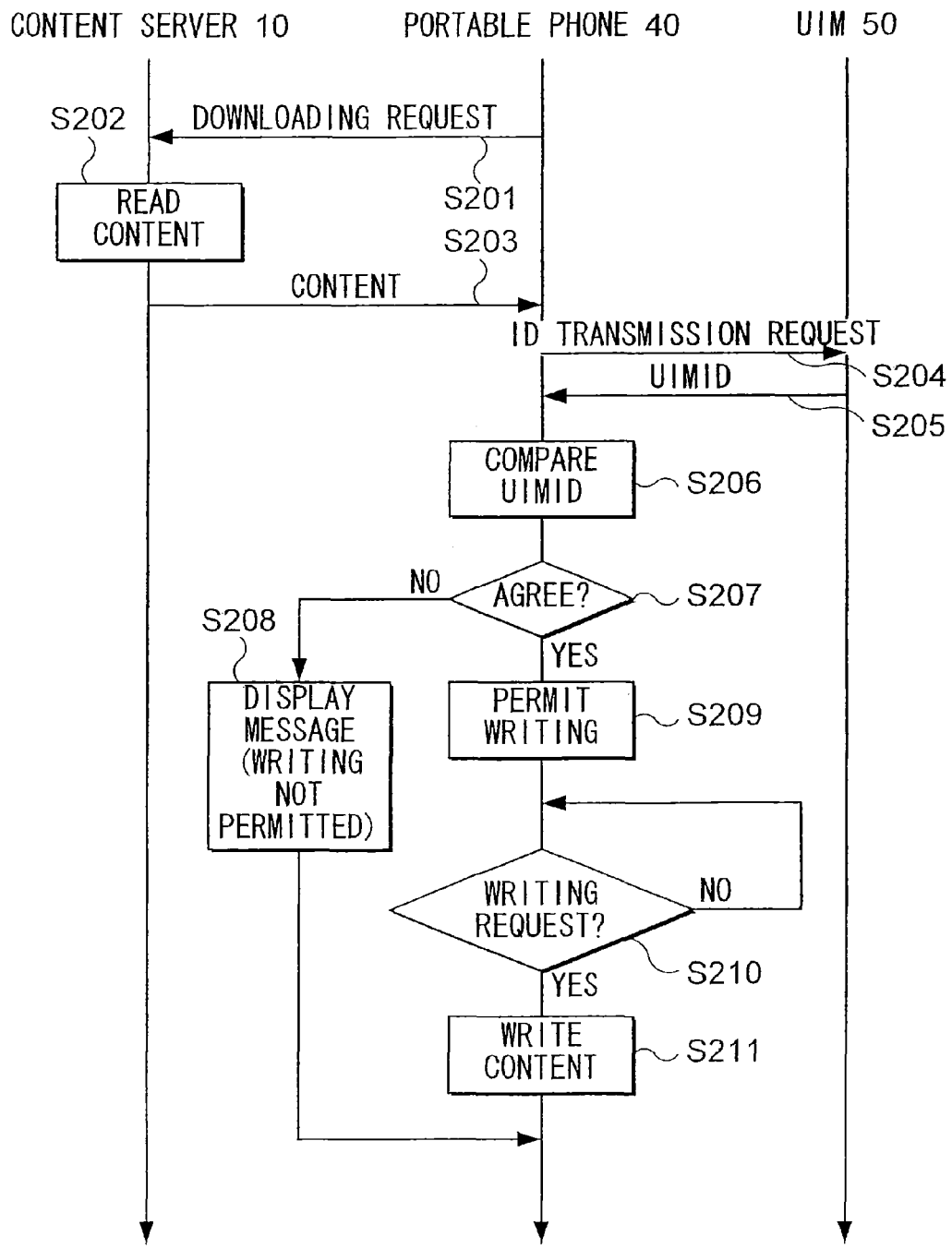
FIG. 5 is a sequence chart showing operations of a content server 10, portable phone 40, and UIM 50 when portable phone 40 downloads content from content server 10 and stores the content in a nonvolatile memory 410 according to the first embodiment.

FIG. 5 is a sequence chart illustrating operations performed by content server 10, portable phone 40, and UIM 50, when phone 40 downloads content from content server 10 and writes the downloaded content into nonvolatile memory 410.

A user of portable phone 40 first inserts his/her own UIM 50 into portable phone 40, and operates phone 40 to activate a web browser. As a result, phone 40 is enabled to display web pages provided from content server 10, on the display screen of phone 40. Then, when the user instructs downloading of content by an operation input while viewing a web page provided from server 10, CPU 405 of phone 40 transmits a downloading request to content server 10 (Step S201). Included in the downloading request are a command for instructing the downloading and data specifying content to be downloaded.

Content server 10, upon receiving the downloading request from portable phone 40, reads from its memory the content specified in the downloading request (Step S202) and transmits the content to phone 40 (Step S203).

CPU 405 of portable phone 40 stores the content received from content server 10 in RAM 409. Subsequently, CPU 405 transmits an ID transmission request to UIM 50 inserted in phone 40 (Step S204). CPU 505 of UIM 50, upon receiving the request, reads from UIMID storage area 504c its own UIMID and transmits the UIMID to phone 40 (Step S205).

CPU 405 of portable phone 40, upon receiving the UIMID from UIM 50, compares the received UIMID to the UIMID stored in owner information registration area 410b (Step S206) to determine whether UIM 50 presently inserted in phone 40 is one owned by the owner of phone 40.

In the case that the received UIMID and the UIMID stored in owner information registration area 410b do not agree with each other (Step S207: No), i.e., in the case that UIM 50 inserted in portable phone 40 is not UIM 50 owned by the owner of phone 40, CPU 405 displays a message on the display screen of the phone, which informs the user that the downloaded content cannot be stored in nonvolatile memory 410 (Step S208).

In the case that the received UIMID and the UIMID stored in owner information registration area 410b agree with each other (Step S207: Yes), i.e., in the case that UIM 50 inserted in portable phone 40 is UIM 50 owned by the owner of phone 40, CPU 405 permits storing of the downloaded content in nonvolatile memory 410 (Step S209), and when it is instructed by the user by an operation input to write the content into nonvolatile memory 410 (Step S210: Yes), writes the content into nonvolatile memory 410 (Step S211).

When downloaded content is stored in nonvolatile memory 410 in Step S211, an identifier is assigned to each content set to indicate that such content has been obtained through a network, and thereby distinguish such content from program or other data stored in advance in nonvolatile memory 410.

In one embodiment of portable phone 40, portable phone 40 is configured so that if the downloaded content is a Java AP, a storage space in the JAR (Java Archive) storage and scratch pad is assigned by JAM (Java Application Manager) for this particular Java AP.

According to the operation shown in the sequence chart of FIG. 5, portable phone 40 stores content downloaded through a network in nonvolatile memory 410 only in a case that UIM 50 inserted in phone 40 is owned by the owner of phone 40, i.e., in a case that a user using phone 40 is the owner of the phone.

On the other hand, in the case that UIM 50 inserted in phone 40 is not owned by the owner of phone 40, i.e., in the case that a user using phone 40 is not the owner of the phone, the storing of downloaded content in nonvolatile memory 410 is not permitted. A user using phone 40 nevertheless can use downloaded content if the usage does not require storing of the content in nonvolatile memory 410. For example, in the case that downloaded content comprises image data or movie data, it is possible to display the content on a display screen of phone 40. It is to be noted that downloaded content may also be stored in UIM 50 which is inserted in phone 40 although the memory capacity of UIM 50 is limited.

It should be especially noted that in the present embodiment, after the downloaded content is stored in the RAM, the determination as to whether to permit storing of the downloaded content in nonvolatile memory 410 (Steps S204-S209) is independently performed without waiting for a writing request from the user. Thus, the determination is performed when the content is received in portable phone 40, and the downloaded content is written into nonvolatile memory 410 if there is a writing request from the user after it is determined that UIM 50 inserted in portable phone 40 at the time of receiving the content is a UIM which a valid user of portable phone 40 is authorized to use.

Figure 6:
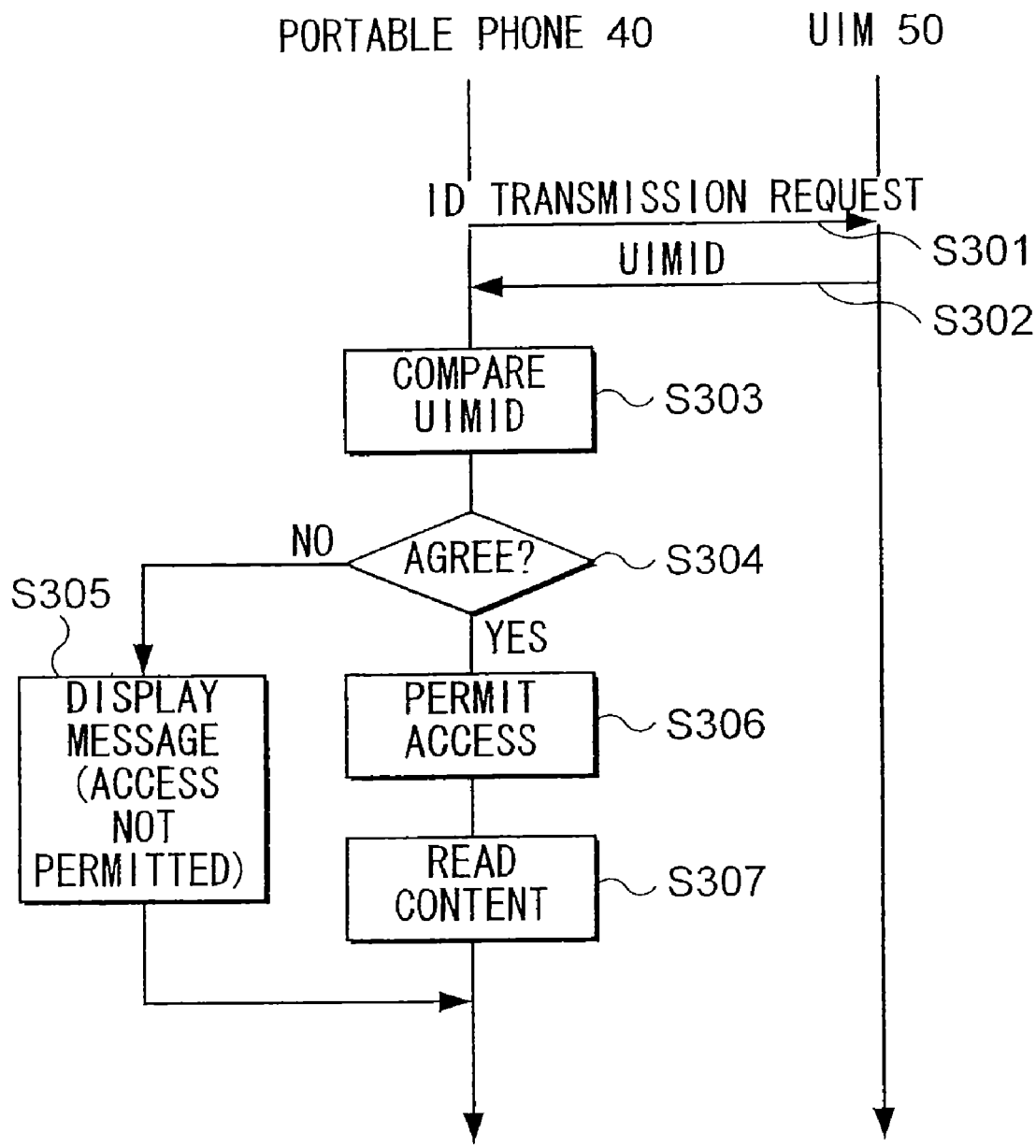
FIG. 6 is a sequence chart showing operations of portable phone 40 and UIM 50 when portable phone 40 reads content stored in nonvolatile memory 410 according to the first embodiment.

FIG. 6 is a sequence chart illustrating operations performed by portable phone 40 and UIM 50 when reading content stored in nonvolatile memory 410 of phone 40.

A user operates portable phone 40 in which his/her own UIM 50 is being inserted, to display on a display screen of phone 40 a list of data or programs stored in nonvolatile memory 410, which data and programs include content downloaded and stored in memory 410 according to the described writing operation (refer to FIG. 5). The user then selects, by an operation input, data or a program to access, from among such content listed on the display screen. CPU 405 of phone 40, having received the operation input for requesting for reading a selected program or data from nonvolatile memory 410, first determines whether the selected data or program is that which was obtained through a network.

The determination is performed on the basis of whether the selected data is assigned the identifier which shows that the content is network-obtained. When it is determined that the selected data or program was obtained through a network, a reading control operation shown in the sequence chart of FIG. 6 is started. In the case that the selected data or program was not obtained through the network, for example, a browser, the operation in FIG. 6 need not be performed because any user of phone 40 may use such data or program.

It should be noted that the following three modes are envisioned as modes of access to content stored in nonvolatile memory 410:

(1) reading content from nonvolatile memory 410, for example, for storing a selected content into UIM 50;
(2) reading content from nonvolatile memory 410 for use in portable phone 40, for example, for displaying a selected content (image data) on a display screen of phone 40, or for executing a selected content (a program) in phone 40; and
(3) referring to content stored in nonvolatile memory 410, for example, confirming whether a selected content is stored in nonvolatile memory 410 by searching memory 410.

In the following description, the second mode among the above three modes is shown for an example operation.

It is also to be noted that a trigger for requesting access to content stored in nonvolatile memory 410 is not limited to an operation input by a user. Instead, a running program may request the reading of content.

As shown in FIG. 6, CPU 405 first transmits to UIM 50 inserted in portable phone 40, an ID transmission request (Step S301). CPU 505 of UIM 50, upon receiving the ID transmission request, reads a UIMID from UIMID storage area 504c for transmission to phone 40 (step S302).

CPU 405 of portable phone 40, upon receiving a UIMID from UIM 50, compares the received UIMID to the UIMID registered in owner information registration area 410b (Step S303) to determine whether the UIM 50 presently inserted in phone 40 is one owned by the owner of phone 40.

In the case that UIMID transmitted from UIM 50 presently inserted in phone 40 does not agree with the UIMID stored in owner information registration area 410b (Step S304: No), i.e., in the case that it is determined that the UIM 50 presently inserted in phone 40 is not one owned by the owner of phone 40, CPU 405 of phone 40 displays on its display screen a message informing a user that s/he is not permitted to access to the content stored in nonvolatile memory 410 because s/he is not the owner of phone 40 (Step S305). In the meantime, CPU cancels the execution of a reading operation because the access to the selected content according to the reading request is not permitted.

In a case that the two UIMIDs compared in Step S303 agree with each other (Step S304: Yes), i.e., in a case that it is determined that the UIM 50 presently inserted in phone 40 is a UIM 50 owned by the owner of phone 40, CPU 405 of phone 40 permits access to the content in question (Step S306), and reads the content from nonvolatile memory 410 (Step S307). If the read content is image data or movie data, CPU 405 displays the content on its display screen. If the content is music data, CPU 405 executes the replaying operation of the content. In a case that the content is a program, CPU 405 starts a process based on the program.

As described, according to the operation shown in the sequence chart of FIG. 6, the access to content stored in nonvolatile memory 410 is permitted by portable phone 40 only when UIM 50 inserted in phone 40 is one owned by the owner of phone 40, i.e., a user using phone 40 is the owner of phone 40.

It is to be noted that when a UIM 50 is inserted into portable phone 40, UIMID of the UIM 50 is stored in UIMID storage area 410*a* of phone 40. Therefore, the stored UIMID, not the UIMID transmitted from UIM 50 in the process of Steps S204 and S205 of FIG. 5, or Steps S301 and S302 of FIG. 6, may be compared to UIMID registered in owner information registration area 410*b* after reading the stored UIMID from UIMID storage area 410*a*.

Modification of First Embodiment

First Modification

Figure 7:
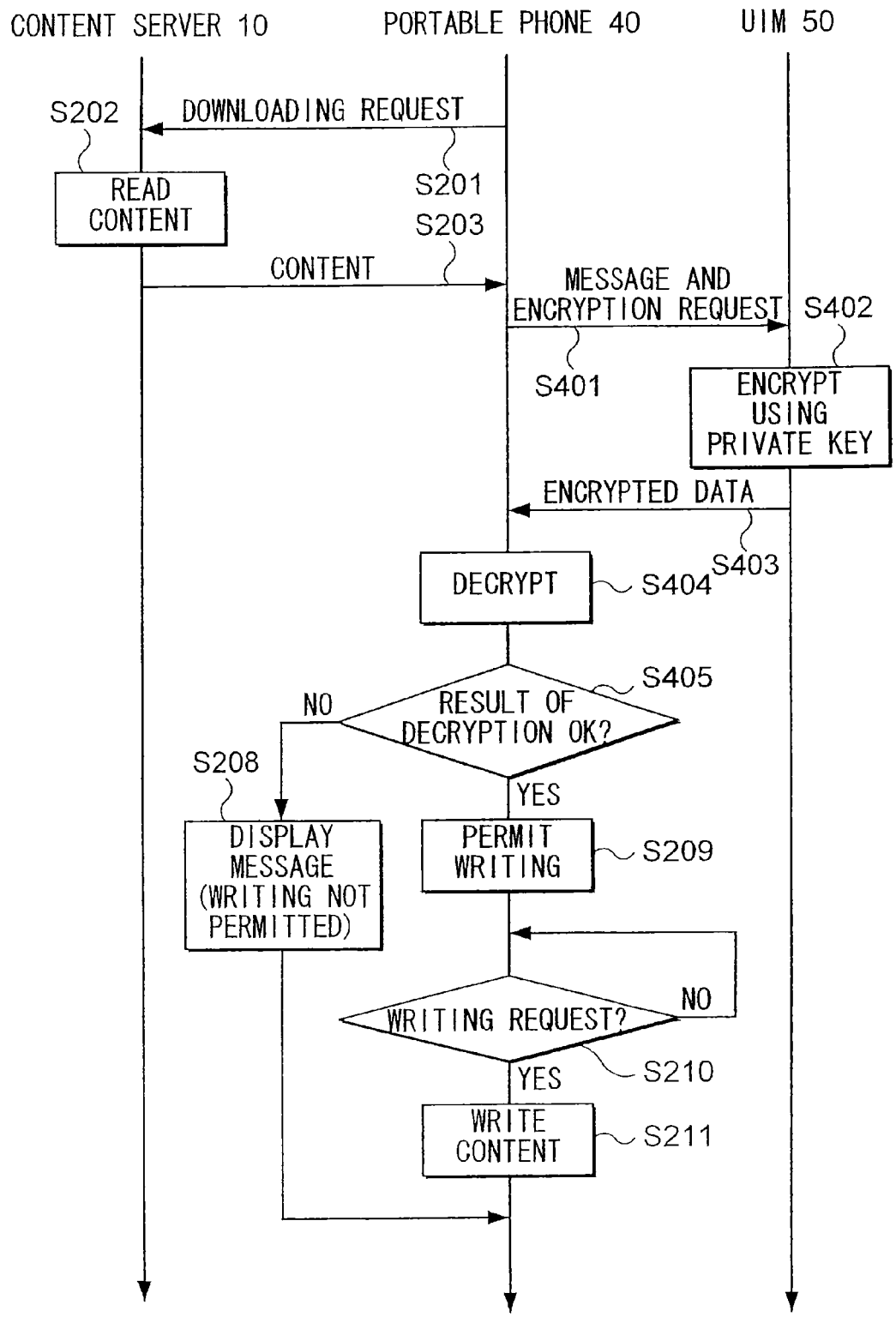
FIG. 7 is a sequence chart showing operations of portable phone 40 and UIM 50 according to a modification of the first embodiment.

The process from Steps S204 to S207 of the writing operation (refer to FIG. 5) may be replaced with the process from Steps S401 to S405 shown in FIG. 7.

In the modification, we assume that authentication information storage area 504*d* stores a private key (secret key) and a public key corresponding to the private key which is the secret half of a key pair. The public/private key pair is authentication information used for enabling the owner of UIM 50 to engage in communications with a higher security using portable phone 40. It is also assumed here that, as a precondition for performing the process shown in FIG. 7, owner information registration area 410*b* of phone 40 stores a public key for the owner of UIM 50, which public key is obtained from UIM 50 owned by the owner of phone 40.

It is noted that, in FIG. 7, 400s step numbers are assigned for steps different from the sequence chart shown in FIG. 5. Also, an explanation will be omitted for the steps which are the same as those included in the sequence chart shown in FIG. 5.

When a user operates portable phone 40 in which his/her own UIM 50 is inserted, to instruct the downloading of content, CPU 405 of phone 40 transmits to content server 10 a downloading request (Step S201). Content server 10 reads from its memory content specified in the downloading request (Step S202) to transmit the content to phone 40 (Step S203).

CPU 405 of portable phone 40 stores the content received from content server 10 in RAM 409. CPU 405 transmits a message (plain text) to be encrypted and an encryption instruction instructing the encryption of the message using a private key for the owner of UIM 50 (Step S401).

CPU 505 of UIM 50, upon receiving the message and the encryption instruction, reads a private key for the owner of UIM 50 from authentication information storage area 504*d* and uses the private key to encrypt the message (Step S402). CPU 505 then transmits the encrypted message to portable phone 40 (Step S403).

CPU 405 of portable phone 40, upon receiving the encrypted message, decrypts the encrypted message using the public key registered in owner information registration area 410*b* (Step S404) to determine whether the message has been decrypted correctly (Step S405). The determination is performed to determine whether UIM 50 presently inserted in portable phone 40 is owned by the owner of phone 40.

In the case that the message has not been decrypted correctly (Step S405: No), i.e., UIM 50 presently inserted in portable phone 40 is not the UIM 50 owned by the owner of phone 40, CPU 405 of phone 40 displays a message informing that downloaded content cannot be stored in nonvolatile memory 410 (Step S208).

In the case that the message has been decrypted correctly, i.e., UIM presently inserted in portable phone 40 is the UIM 50 owned by the owner of phone 40 (Step S405: Yes), CPU 405 permits the storing of the downloaded content in nonvolatile memory 410 (Step S209) and when it is instructed, for example, by an operation input, to write the content into nonvolatile memory 410 (Step S210: Yes), writes the content into nonvolatile memory 410 (Step S211).

As has been described, the writing process of Steps S204 to S207 (refer to FIG. 5) may be replaced with the process from Steps S401 to S405 in the sequence chart shown in FIG. 7. Similarly, in the reading operation described in the first embodiment, the process from Steps S301 to S304 (refer to FIG. 6) may be replaced with the process from Steps S401 to S405 of FIG. 7. The same effects as the above first embodiment are attainable in the modification.

Second Modification

In the above first embodiment, UIMID is used to determine whether UIM 50 presently inserted in UIM 50 is one which is owned by the owner of portable phone 40. A telephone number (identification information for receiving a communication service) stored in UIM 50, instead of UIMID, may be used to determine whether UIM 50 presently inserted in UIM 50 is one which is owned by the owner of portable phone 40. Alternatively, a user ID stored in subscriber information storage area 504*a* may be used for the determination. Still alternatively, authentication information such as a password, public key, private key and the like may be used instead of UIMID, the authentication information being stored in UIM 50 and used for user authentication. Thus, identification information used in the determination includes any type of information stored in UIM 50 if the information is unique to UIM 50 or a valid user of UIM 50.

Third Modification

In the above first embodiment, UIMID is used to determine whether UIM 50 presently inserted in UIM 50 is one which is owned by the owner of portable phone 40. A determination using a private/public key pair for the owner of UIM 50 may be performed in addition to the determination using UIMID. In this case, owner information registration area 410*b* stores, in addition to UIMID of UIM 50 owned by the owner of portable phone 40, a public key of the owner of UIM 50. Alternatively, in addition to the determination using UIMID, a determination using authentication information (for example, a password, a private key, etc.) for the owner of UIM 50 may be performed.

B. Second Embodiment

Next, a description will be given of a second embodiment of the present invention. In the figures, like components are assigned the same reference numerals as used in the first embodiment. Also, an explanation will be omitted for like portions. The configuration of communication system 1 according to the second embodiment is the same as that of the first embodiment as shown in FIG. 1, except that a portable phone is now assigned the reference number 41 and a UIM the reference number 51.

The second embodiment differs from the above first embodiment in that the registering operation of UIMID of UIM 50 owned by the owner of portable phone 40 is not performed in the second embodiment. Instead, a UIMID of a UIM 51 which is inserted in a portable phone 41 at the time of downloading content is stored in association with the downloaded content.

Figure 8:
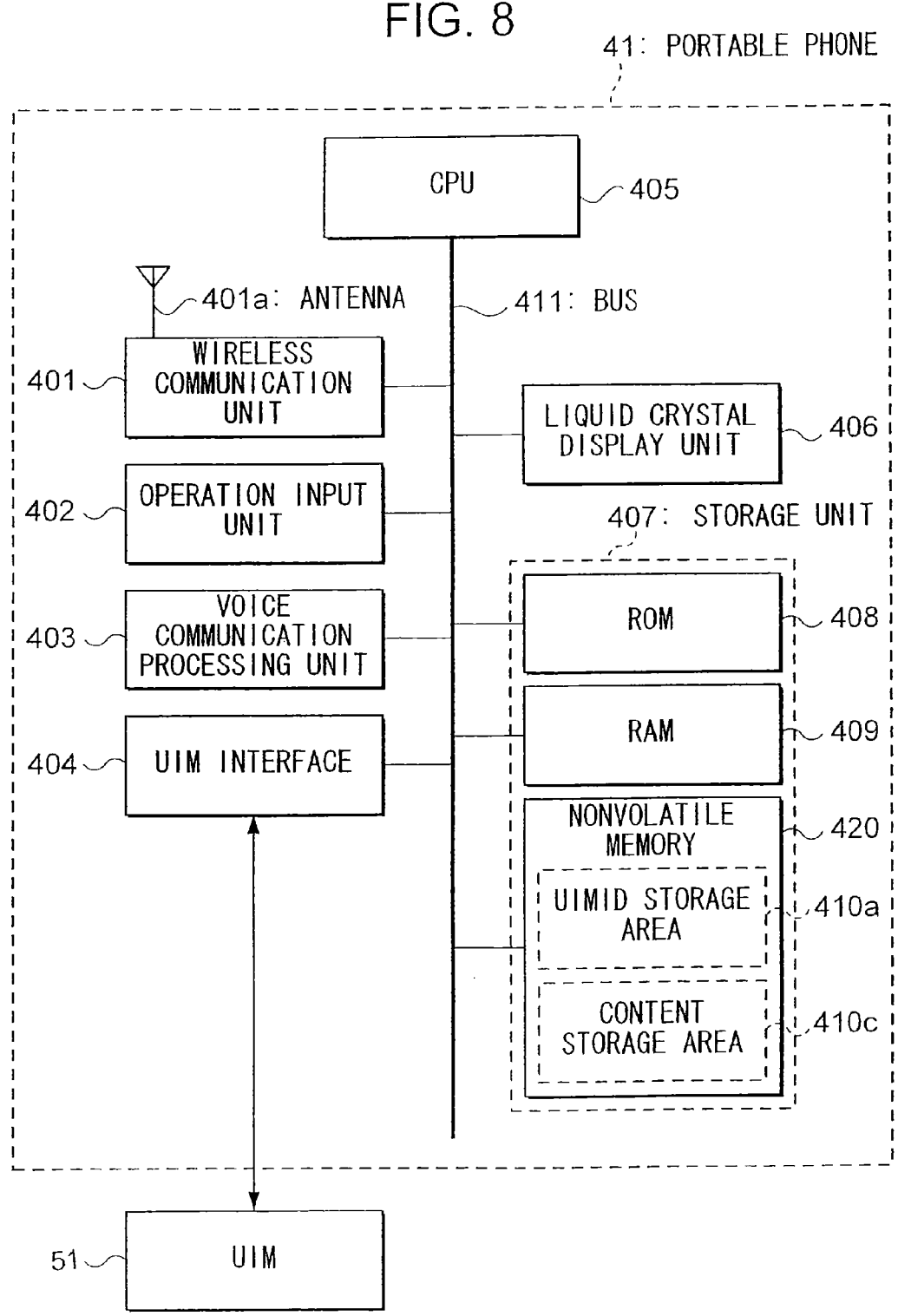
FIG. 8 is a block diagram showing a hardware configuration of a portable phone 41 according to a second embodiment of the present invention.
Figure 9:
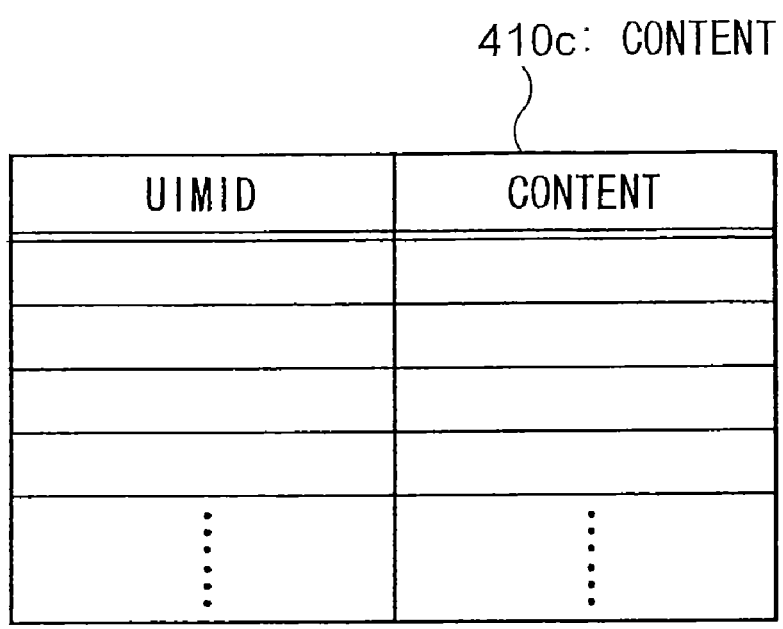
FIG. 9 is a diagram illustrating a data configuration of a content storage area 410c in a nonvolatile memory 420 according to the second embodiment.

FIG. 8 is a block diagram illustrating a hardware configuration of portable phone 41 according to the second embodiment. Portable phone 41 shown in FIG. 8 differs from portable phone 40 in the first embodiment in that a content storage area 410c is provided instead of owner information registration area 410b. When content is downloaded from content server 10, data of the content is stored in content storage area 410c in association with a UIMID of a UIM 51 which is inserted in portable phone 41 at the time of downloading the content, in such a way as shown in FIG. 9. It is to be noted that FIG. 9 is a conceptual diagram showing an exemplary table of content and UIMIDs stored in association with each other. Instead of linking data of each content set to an associated UIMID, identification information of each content set may be stored in association with an associated UIMID in a separate content list in nonvolatile memory 420.

Among content stored in content storage area 410c, Java AP preferably comprises JAR files as well as ADF (Application Descriptor File) which describes various control information for controlling installment and activation of the JAR files and network access operations.

CPU 405 implements various programs stored in storage unit 406, thereby controlling each of the units connected to CPU via bus 411. According to the second embodiment, when content is downloaded from content server 10, CPU 405 stores downloaded content in content storage area 410c in association with a UIMID of a UIM 51 which is inserted in portable phone 41 at the time of downloading content. It is to be noted that a UIMID of the present UIM 51 is stored in UIMID storage area 410a when the UIM 51 is inserted in portable phone 41.

Further, in a case where access to a downloaded content (e.g., execution of a Java AP, displaying of image data, etc) is instructed by a present user of portable phone 41, CPU 405 compares the UIMID stored in UIMID storage area 409a to a UIMID which is stored in association with the content to be used, thereby determining whether to permit access to the content by the user. In other words, when access to content stored in content storage area 410c is requested by a user, portable phone 41 gives permission to the requesting user if s/he is the owner of UIM 51 inserted in portable phone 41 at the time of downloading content from content server 10. This is because content server 10 has agreed to provide content only to the owner of UIM 51 which has downloaded content, not to the owner of portable phone 41, and therefore, access to the content is to be allowed only to the owner of the downloading UIM 51 unless otherwise specified.

Figure 10:
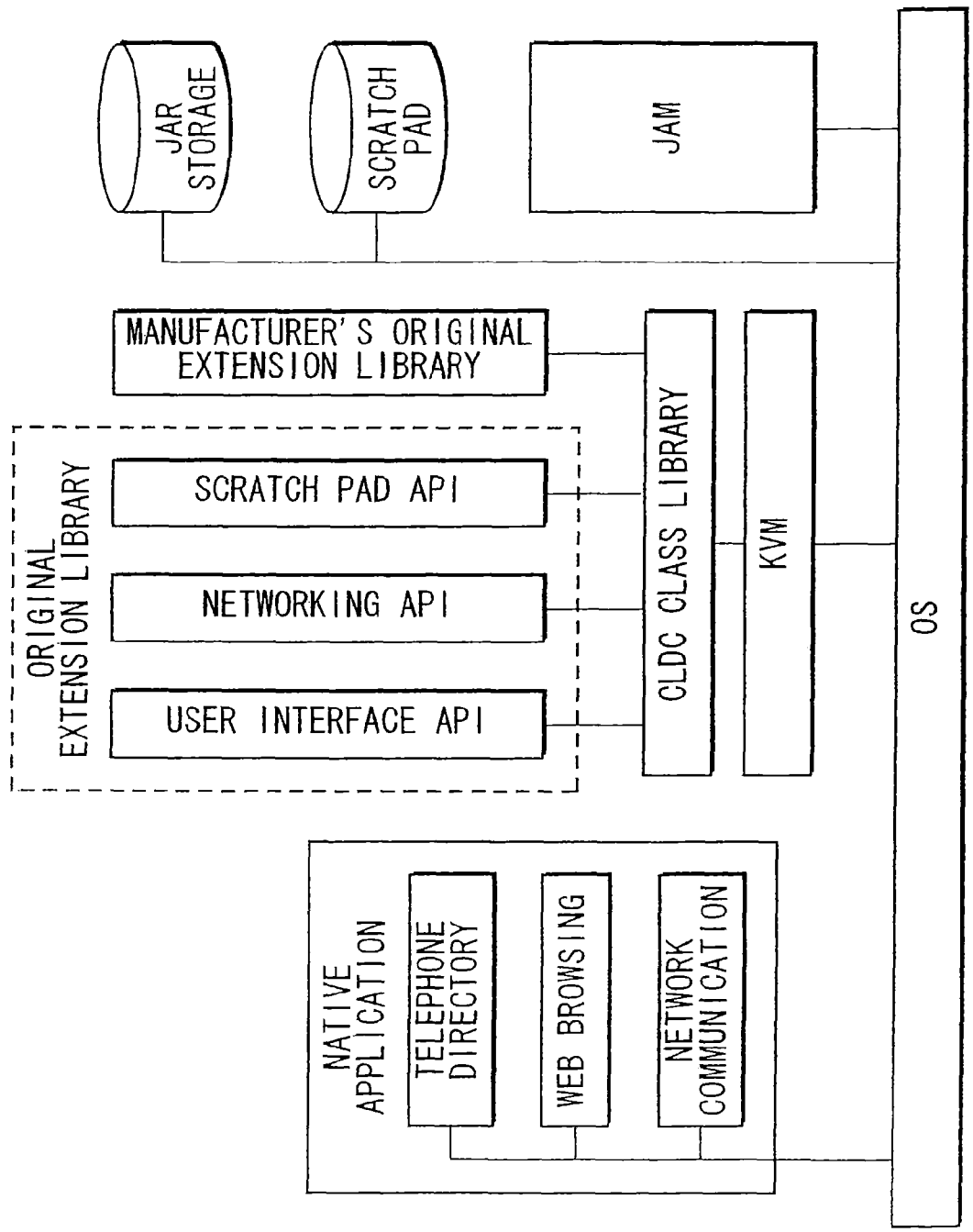
FIG. 10 is a diagram for describing a runtime environment of Java applications in portable phone 41 according to the second embodiment.

FIG. 10 shows one implementation of a Java AP runtime environment in portable phone 41. Portable phone 41 is provided with KVM (K Virtual Machine) as a software for building a runtime environment for Java APs, and CLDC (Connected Limited Device Configuration). CLDC is Java runtime environment foundation targeting compact, resource-constraint devices such as mobile stations, and is supported by KVM. In addition, portable phone 41 is also provided with J2ME (Java 2 Micro Edition) comprising an original Java extension profile which is created by a communication carrier. It should be especially noted that providing a Java runtime environment in portable phone 41 is not required in the present invention but is only optional.

As shown in FIG. 10, native applications include software programs providing such functions as a telephone directory, web browsing, and network communication, which software programs being executed under the control of OS. Used as KVM is JVM (Java Virtual Machine) which is especially designed for compact electronic devices. JVM converts byte codes in the file format of implementing Java APs into instruction codes that can be interpreted/executed by CPU 405 by aid of OS.

An original Java extension library is a class library for providing functions exclusive to portable phones, having CLDC as its foundation. Included in the original Java extension library is, for example, a user interface API (Application Program Interface), a networking API, and a scratch pad API. In addition to a CLDC class library and the original Java extension library, portable phone 41 is provided with a manufacturer's original extension library in which original functions are provided by a manufacturer of portable phones 41.

JAM (Java Application Manager) has a function of managing Java APs installed in portable phone 41, under the control of OS. JAM provides such functions as displaying a list of Java APs stored in portable phone 41, managing implementation (activation, forced termination, etc.) of Java APs, installing or updating Java APs, and deleting Java APs stored in portable phone 41. It is to be noted that JAM is a native component independent from KVM, and therefore cannot be controlled from Java APs.

A JAR (Java Archive) storage and a scratch pad are storage areas provided in content storage area 410c of nonvolatile memory 420. The JAR storage stores, for each Java AP installed in portable phone 41, JAR files for respective Java APs. A JAR file includes the Java AP program itself, and image files, voice files, and the like used when the program is executed. Similarly, the scratch pad stores data for respective Java APs. Data stored in the scratch pad are retained permanently. Further, a Java AP is controlled by JAM so as to access only data of its own among data sets for respective Java APs. A storage area for each Java AP in the JAR storage and the scratch pad is assigned by JAM when a Java AP is installed.

Figure 11:
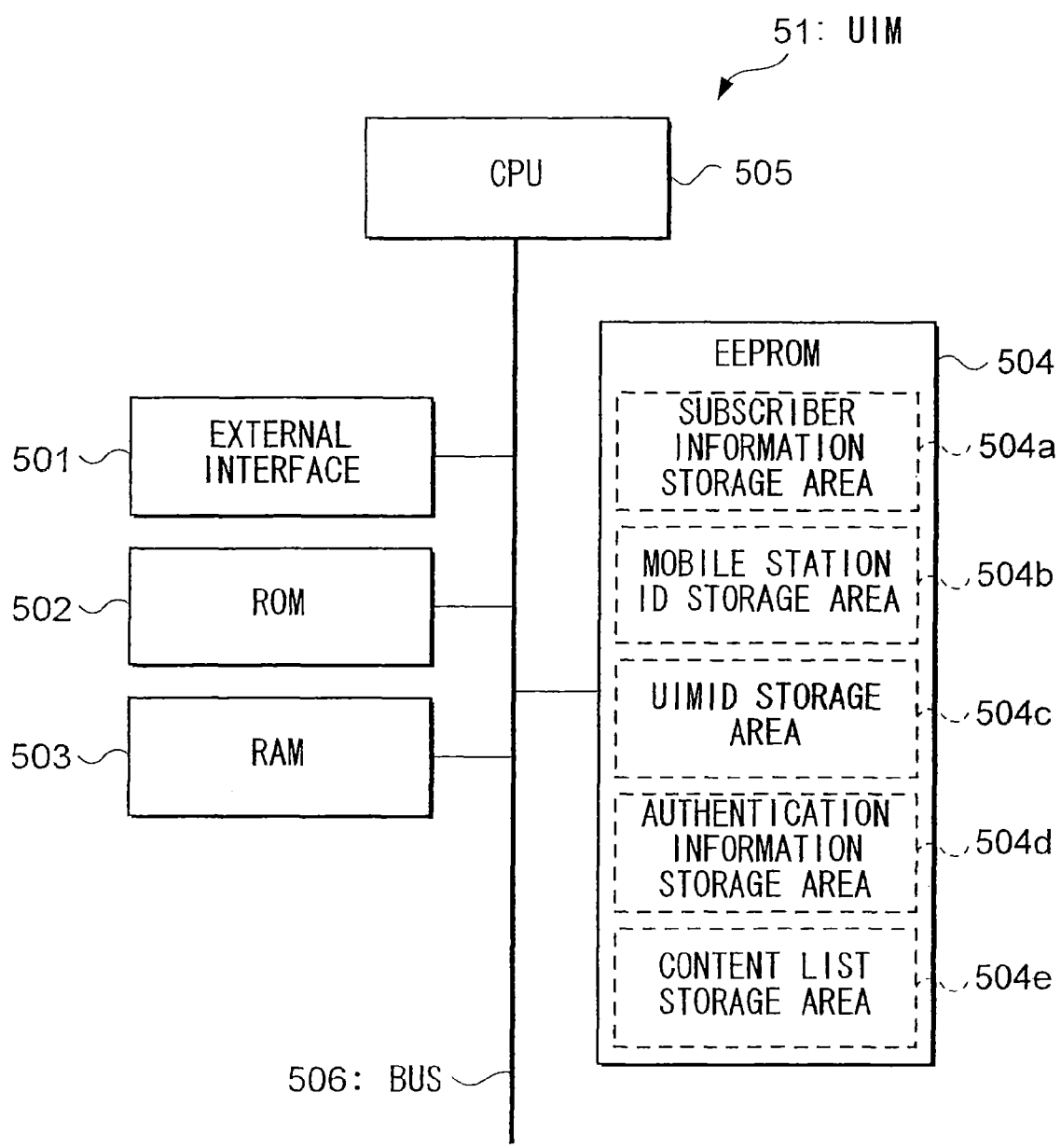
FIG. 11 is a block diagram illustrating a hardware configuration of a UIM 51 according to the second embodiment.
Figure 12:
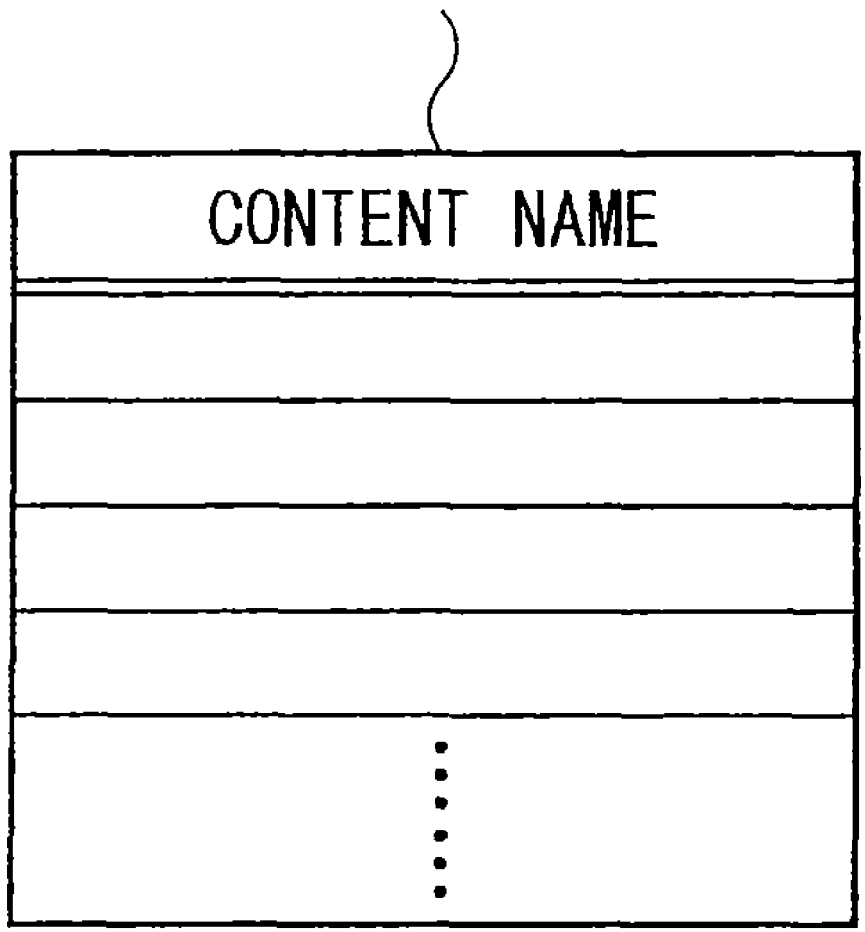
FIG. 12 is a diagram illustrating a data configuration of a content list in content list storage area 504e in EEPROM 504 according to the second embodiment.

FIG. 11 is a block diagram illustrating a hardware configuration of a UIM 51 according to the second embodiment. UIM 51 is different from UIM 50 of the first embodiment in that UIM 51 further comprises a content list storage area 504e which stores a list of content downloaded by inserting UIM 51 into any portable phone 41. The content name, for example, a file name of a downloaded content is stored in the content list as shown in FIG. 12. As described above, data of the downloaded content is stored in content storage area 410c of portable phone 41. When the content is deleted from content storage area 410c by the owner of UIM 51, the content name of the corresponding content is deleted from the content list of content list storage area 504e of UIM 51.

Operation of Second Embodiment

In the following, an explanation will be given on a case where a Java AP is downloaded using portable phone 41 in which UIM 51 is inserted, and the downloaded Java AP is executed by a request from a user. It is to be noted that Java AP is only an example of content that is downloaded and that downloaded content may include image data, music data, programs other than Java APs, and the like.

Figure 13:
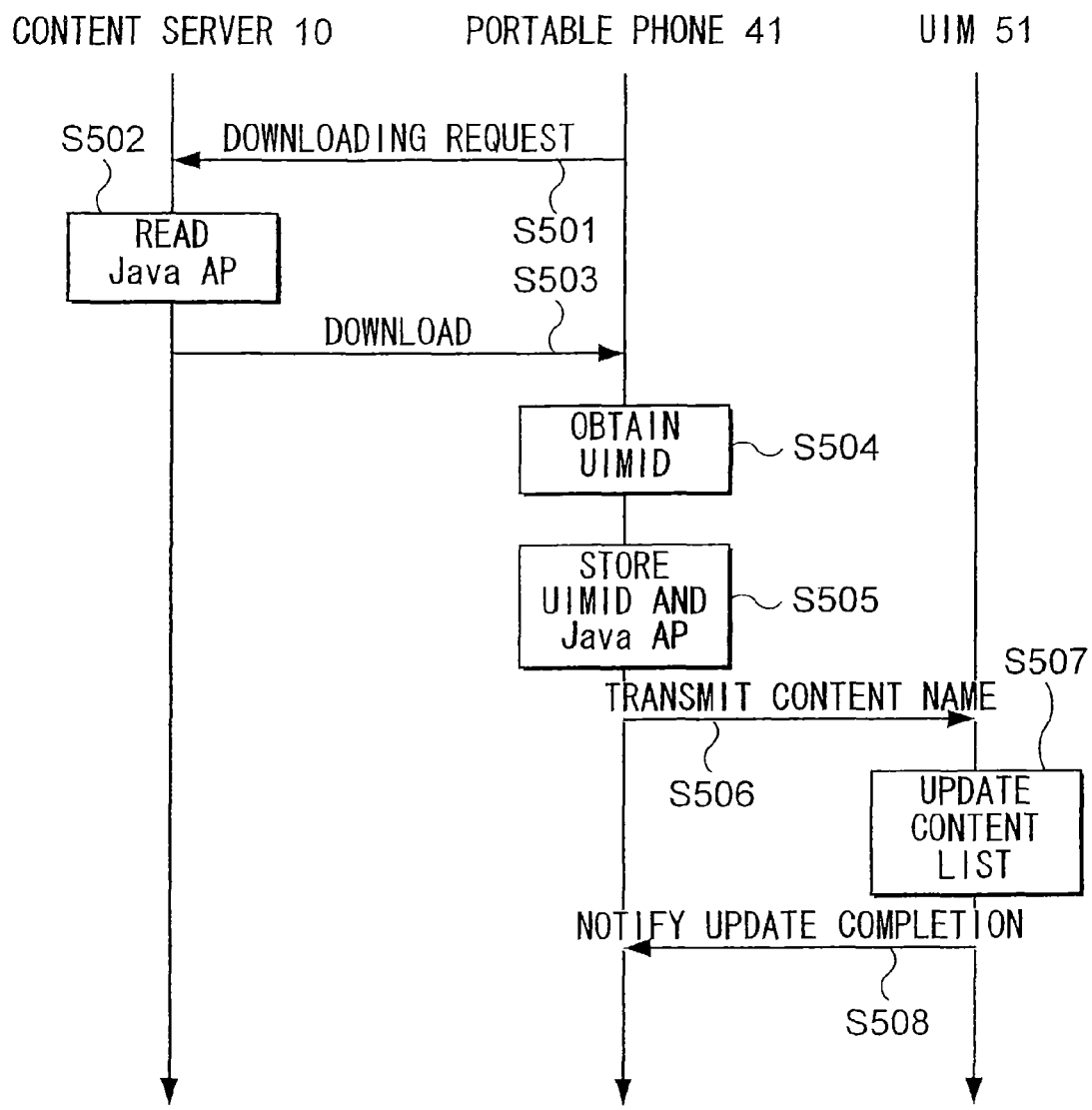
FIG. 13 is a sequence chart showing operations of a content server 10, portable phone 41, and UIM 51 when portable phone 41 downloads a Java application from content server 10 according to the second embodiment.

FIG. 13 is a sequence chart showing operations of content server 10, portable phone 41, and UIM 51 in a case that portable phone 41 downloads a Java AP from content server 10. First, a user inserts his/her UIM 51 into portable phone 41, and requests for activation of a web browser by operating operation input unit 402 of portable phone 41. As a result, portable phone 41 is enabled to display on its display screen web pages provided from content server 10. Then, the user requests for downloading of a Java AP by an operation input while viewing a web page, and the downloading operation as shown in FIG. 13 is started.

CPU 405 of portable phone 41 transmits a downloading request to content server 10 through wireless communication unit 401 (Step S501). The downloading request includes a command instructing the downloading and information specifying a Java AP. The downloading request is transmitted to content server 10 via mobile packet communication network 30 and the Internet 20. Content server 10, upon receiving the downloading request, reads from its memory the Java AP specified in the request (Step S502), and transmits the Java AP to portable phone 41 (Step S503).

Before transmitting the downloading request, portable phone 41 transmits a request to content server 10 for the transmission of an ADF (Application Descriptor File) of a Java AP to be downloaded. After receiving the ADF from content server 10, CPU 405 of phone 41 determines whether the Java AP can be downloaded on the basis of information included in the ADF. For example, in a case that the size of the JAR file of the Java AP is larger than the size allowed in phone 41, CPU 405 determines that the Java AP cannot be downloaded. In the case that it is determined that the Java AP can be downloaded, CPU 405 of portable phone 41 transmits to content server 10 a request for the downloading of an applicable JAR file on the basis of the ADF (Step S501). It is noted that the JAR file is stored in a server whose location is designated in the ADF, specifically in "PackageURL" (refer to FIG. 20), and the server storing the JAR file may be different from content server 10 which has transmitted the ADF. In this case, CPU 405 of portable phone 41 transmits the request for downloading the JAR file to content server 10 designated by the PackageURL, not to content server 10 which has transmitted the ADF. Thus, more than one content items (i.e., the ADF and JAR file) may be downloaded from more than one content servers 10, in such a case where receiving a complete application program requires the receiving of more than one content items.

After receiving the Java AP transmitted from content server 10, CPU 405 of portable phone 41 obtains a UIMID from UIMID storage area 410*a* (Step S504). The obtained UIMID is that of UIM 51 which is presently inserted in portable phone 41 because when UIM 51 is inserted into phone 41, UIMID of the inserted phone 41 is stored in UIMID storage area 410*a*. Subsequently, CPU 405 stores the UIMID obtained in Step S504 in content storage area 410*c* in association with the downloaded Java AP (Step S505).

Specifically, in Step S505, CPU 405 assigns, by the aid of JAM, a storage area in each of the JAR storage and the scratch pad of content storage area 410*c*. Subsequently, CPU 405 installs the downloaded JAR file in the assigned JAR storage, and at the same time stores the JAR file in association with the ADF of the Java AP and the UIMID in content storage area 410*c*.

In Step S506, CPU 405 of portable phone 41 obtains the name of the downloaded content, for example, the file name of the JAR file, and transmits the obtained content name to UIM 51 through UIM interface 404. CPU 505 of UIM 51 receives the name of the downloaded content through external interface 501, and adds the content name to the content list in content list storage area 504*e*, thereby updating the content list (Step S507). CPU 505 then transmits to portable phone 41*a* notification that the updating of the content list is completed (Step S108).

Next, a process of executing a Java AP will be explained with reference to the flow chart shown in FIG. 14. The process is performed by CPU 405 of portable phone 41, by the aid of JAM, when an operation instruction for instructing the execution of the Java AP is input.

CPU 410 first obtains, from content storage area 410*c*, a UIMID corresponding to the Java AP to be executed (Step S601). It is to be noted that the UIMID obtained in Step S601 is that of a UIM 51 inserted in portable phone 41 at the time of downloading the Java AP. Subsequently, CPU 405 obtains a UIMID stored in UIMID storage area 410*a*, which UIMID is that of a UIM which is presently inserted in portable phone 41 (Step S602).

CPU 405 then compares the UIMID obtained in Step S601 with the UIMID obtained in Step S602 to determine whether the two UIMIDs agree with each other (Step S603, S604). In other words, CPU 405 compares a UIMID of a UIM 51 inserted in portable phone 41 at the time of downloading a Java AP to be executed, with a UIMID of a UIM 51 which is presently inserted in phone 41, thereby to determine whether a user requesting the execution of a Java AP is the one who has downloaded the Java AP from content server 10.

In the case that the two UIMIDs do not agree with each other (Step S604: No), CPU 405 cancels the execution of the Java AP (Step S605), and displays on its display screen a message informing the user that the execution of the Java AP has been cancelled (Step S606). The message may also inform the user that, if s/he wishes to use the Java AP, it has to be downloaded from content server 10 using his/her own UIM 51. Further, the message may include information on how to download the Java AP as guidance information. Then, the operation of executing a Java AP is ended.

In the case that the two UIMIDs agree with each other (Step S604: Yes), CPU 405 permits the execution of the Java AP (Step S607) because the user requesting the execution of the Java AP is the one who has downloaded the Java AP from content server 10, and who has been given permission by content server 10 to access the Java AP. CPU 405 then activates the Java AP (Step S608), and starts the process according to the program.

As has been described, the present embodiment enables portable phone 41 to restrict access to a Java AP downloaded from content server 10 only to the owner of a UIM 51 inserted in portable phone 41 at the time of downloading the Java AP.

Modification of Second Embodiment

In the Java AP execution operation (refer to FIG. 14), UIMID is used to determine whether to allow access to a Java AP. However, a content list stored in content list storage area 504*e* may be used instead of UIMID.

Figure 14:
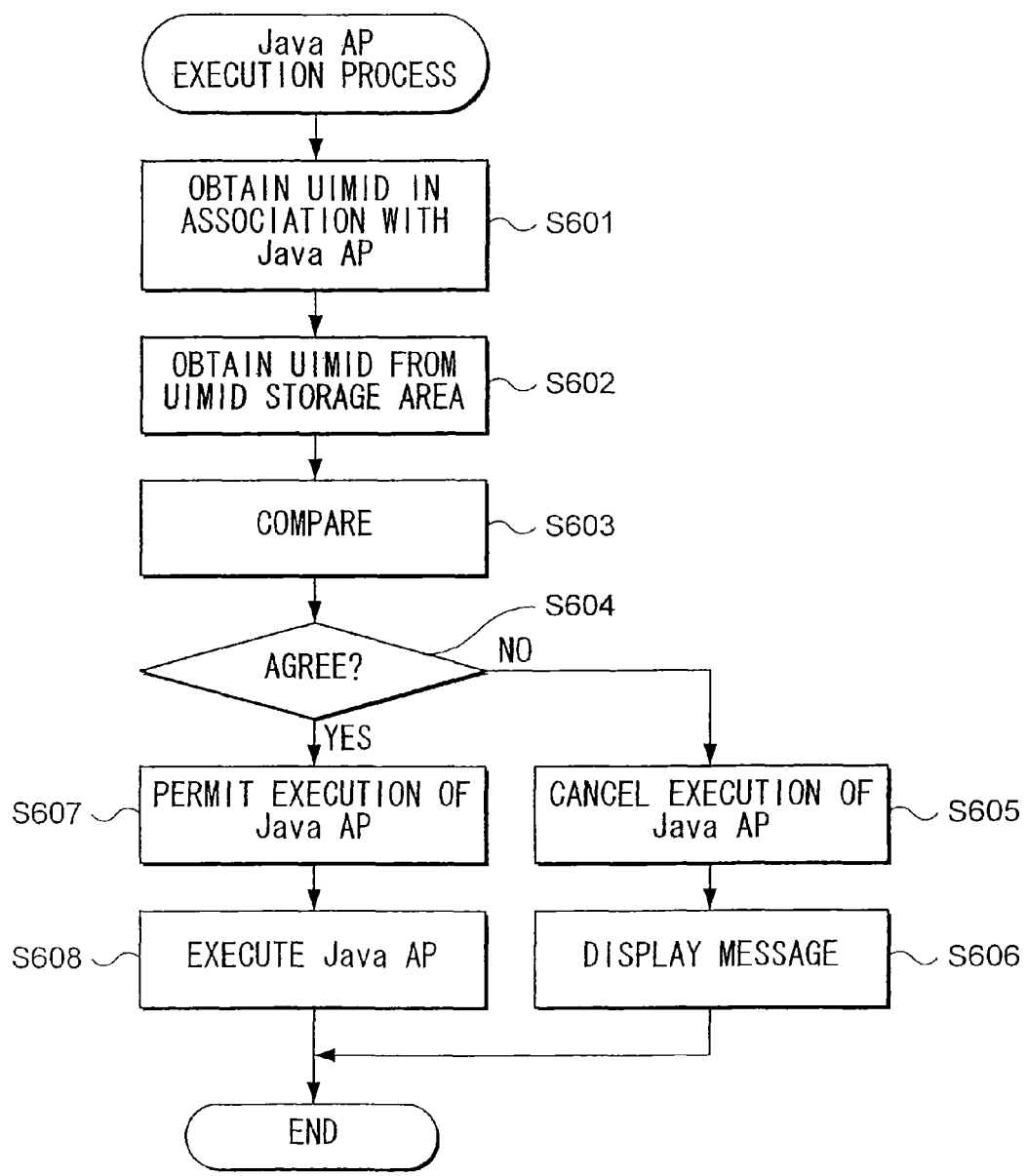
FIG. 14 is a flow chart showing a Java execution process performed by CPU 405 of portable phone 41 according to the second embodiment.
Figure 15:
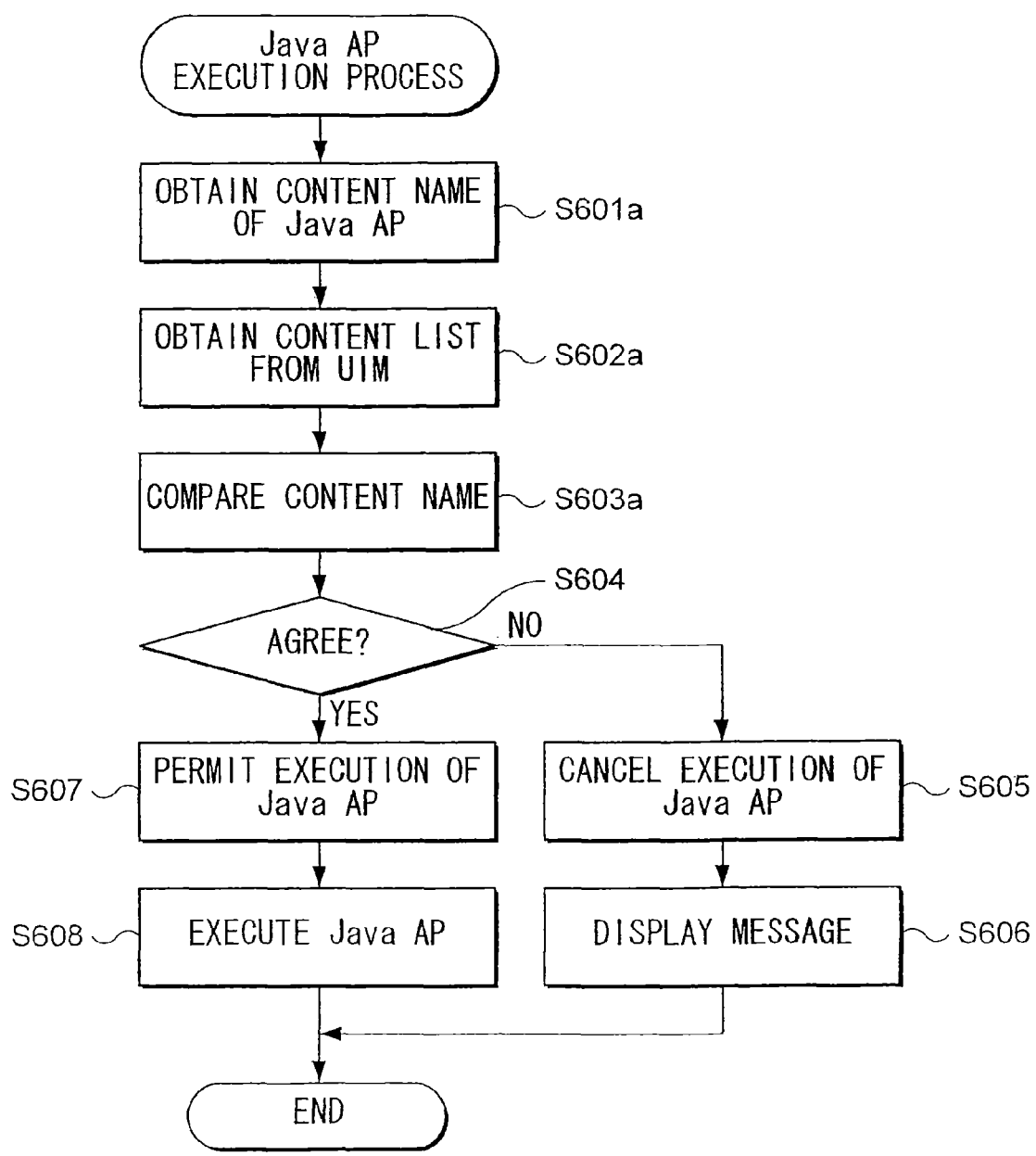
FIG. 15 is a flow chart showing a Java execution process performed by CPU 405 of portable phone 41 according to a modification of the second embodiment.

FIG. 15 is a flow chart showing an operation of portable phone 41 in determining whether to allow access to a Java AP using a content list stored in content list storage area 504*e*. The operation shown in the figure is executed through JAM by CPU 405 of phone 41 when an operation instruction is input to instruct the execution of the Java AP. It is to be noted that, for the like steps, the same step numbers as FIG. 14 have been assigned.

CPU 405 first obtains, from content storage area 410c, the content name (e.g. the file name of a JAR file) of a Java AP to be executed (Step S601a). Next, CPU 405 performs communication with UIM 51 through UIM interface 404 to obtain a content list from content list storage area 504e of UIM 51 (Step S602a).

CPU 405 then determines in Step S603a whether the content name of the Java AP obtained in Step S601a agrees with any one of content name(s) included in the content list obtained in Step S602a, thereby determining whether a present user of portable phone 41 instructing the execution of the Java AP is the one who has downloaded the Java AP from content server 10.

In the case that the content name of the Java AP to be executed does not agree with any of the content name(s) listed in the content list (Step 604: No), the execution of the Java AP is cancelled (Step S605). A message of canceling the execution of the Java AP is displayed on a display screen of portable phone 41 (Step S606), before ending the operation.

In the case that the content name of the Java AP to be executed agrees with any of the content name(s) listed in the content list (Step 604: Yes), it is determined that the user requesting the execution of the Java AP is the one who has downloaded the Java AP from content server 10 and is also a user who is officially permitted by content server 10 for the provision of and the access to the Java AP, CPU 405 thus allowing the execution of the Java AP (Step S607). The Java is thus activated (Step S608), and the process according to the program is started.

Thus, a content list stored in content list storage area 504e may be used, instead of UIMID, to determine whether to allow access to a Java AP. Further, the content list may be used in addition to UIMID.

C. Third Embodiment

Next, a description will be given on a third embodiment of the present invention. The configuration of the third embodiment is the same as the second embodiment, so an explanation thereof will be omitted here. In other words, communication system 1 in FIG. 1, portable phone 41 in FIG. 8, and UIM 51 as shown in FIG. 11 will be referred to in the third embodiment.

Figure 16:
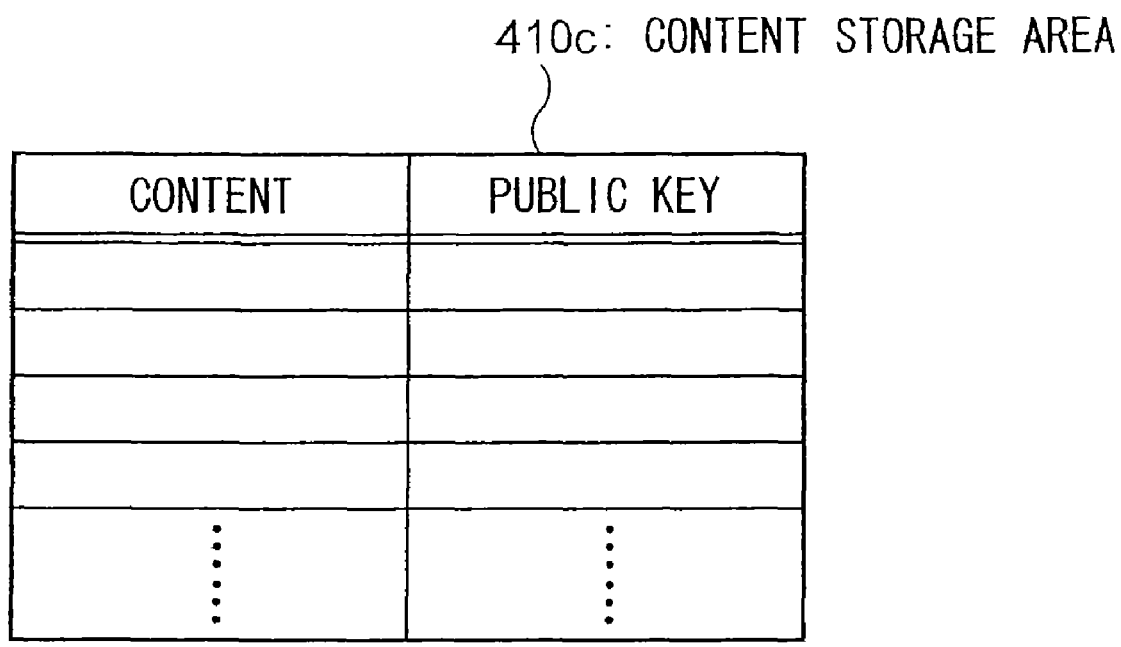
FIG. 16 is a diagram showing a data configuration of a content storage area 410c in a nonvolatile memory 420 according to a third embodiment of the present invention.

In the third embodiment, we assume a private/public key pair is generated for the owner of UIM 51 and stored in authentication information storage area 504d of the UIM 51 (refer to FIG. 11). Also, content downloaded from content server 10 is stored in content storage area 410c of nonvolatile memory 420 (refer to FIGS. 8 and 16) in association with a public key for the owner of a UIM 51 which is inserted in portable phone 41 at the time of downloading the content, while, in the second embodiment, downloaded content is stored in association with a UIMID of the downloading UIM 51. The public key stored in association with the downloaded content is obtained from the UIM 51.

Instead of associating a public key with the content itself, a public key may be associated with content identification information which is assigned to each content stored in nonvolatile memory 420. In this case, a separate content list may be stored in nonvolatile memory 420.

Figure 17:
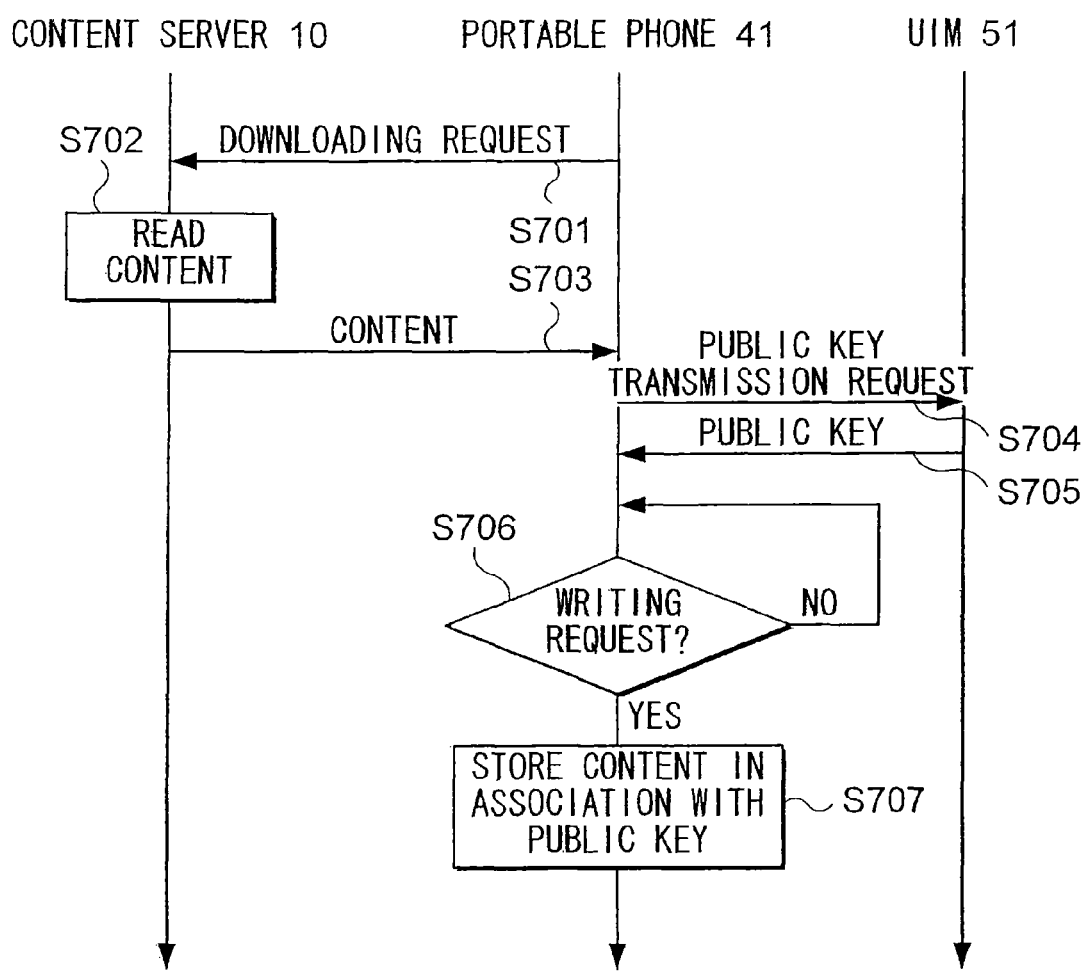
FIG. 17 is a sequence chart showing operations of a content server 10, a portable phone 41, and a UIM 51 when portable phone 41 downloads content from content server 10 and stores the content in nonvolatile memory 420 according to the third embodiment.

FIG. 17 is a sequence chart showing operations of content server 10, portable phone 41, and UIM 51 for downloading content from content server 10 and storing the content in nonvolatile memory 420.

When a user requests the downloading of content by operating portable phone 41 in which his/her own UIM 51 is inserted, CPU 405 of phone 41 transmits a downloading request to content server 10 (Step S701). Content server 10 reads from its memory content designated in the request (Step S702) to transmit the content to phone 41 (Step S703).

CPU 405 of portable phone 41 stores the content received from content server 10 in RAM 409, and then transmits a public key transmission request to the UIM 51 which is inserted in portable phone 41 (Step S704). CPU 505 of UIM 51, upon receiving the request, reads a public key for the owner of UIM 51 from authentication information storage area 504d to transmit the public key to portable phone 41 (Step S705).

CPU 405 of portable phone 41, when it is requested by the user, for example, by an operation input, to store the content in nonvolatile memory 420 (Step S706: Yes), stores the public key, in nonvolatile memory 420, in association with the downloaded content. Alternatively, a public key of the owner of UIM 51 may be transmitted from UIM 51 to portable phone 41 for storage into nonvolatile memory 420 at the time when UIM 50 is inserted into phone 41, and instead of requesting UIM 51 to transmit a public key in Steps S704 and S705, CPU 405 may read the public key stored in nonvolatile memory 420 and store the public key in association with the downloaded content in nonvolatile memory 420.

Figure 18:
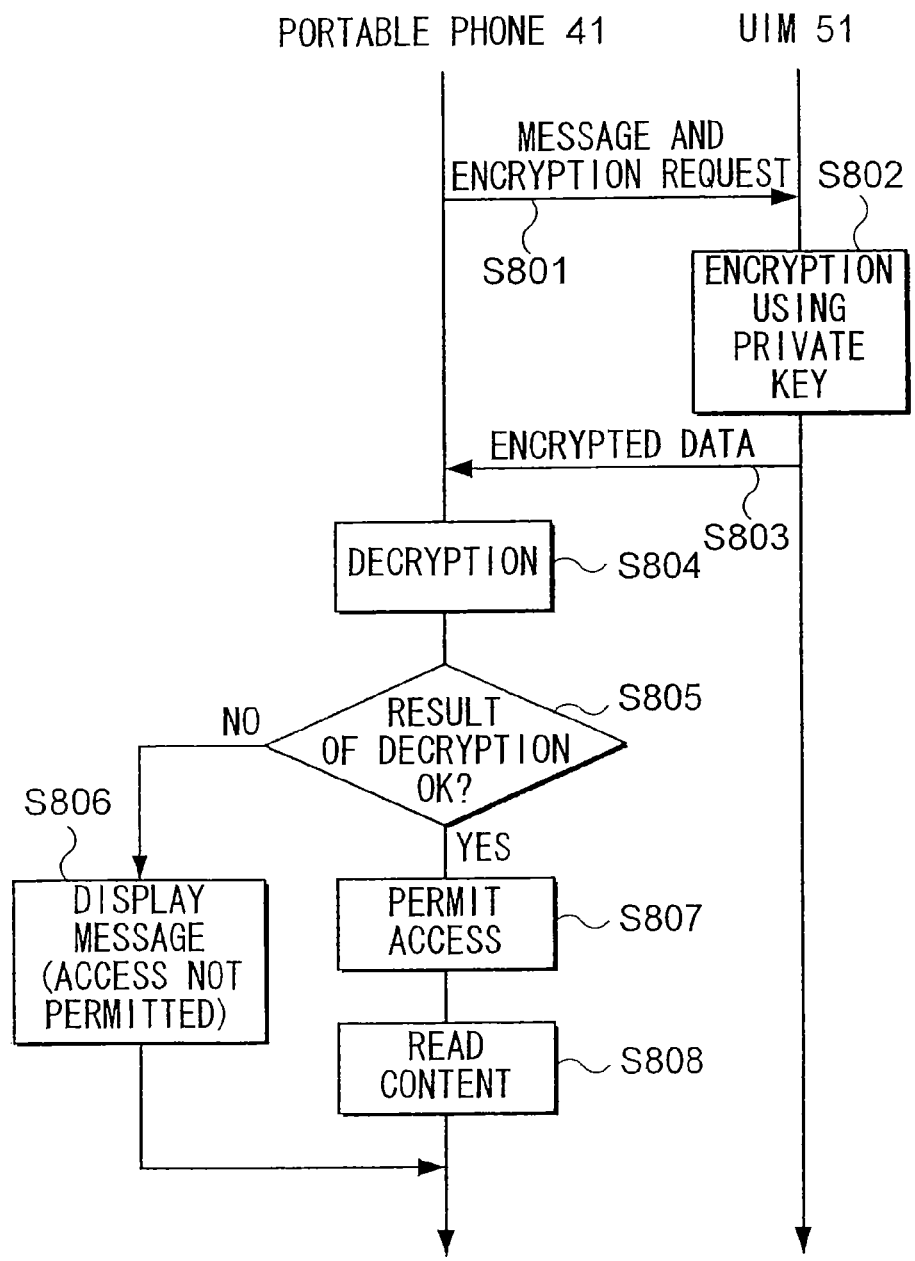
FIG. 18 is a sequence chart showing operations of portable phone 41 and UIM 51 when portable phone 41 reads content stored in nonvolatile memory 420 according to the third embodiment.

FIG. 18 is a sequence chart illustrating operations of portable phone 41 and UIM 51 when reading content stored in nonvolatile memory 420 in portable phone 41.

A user operates portable phone 41 in which his/her own UIM 51 is inserted to display on a display screen of phone 41 a list of data and programs stored in nonvolatile memory 420. The user then selects, from among the listed data or programs on the screen, data or a program to use, for example by an operation input. When a reading operation of the selected data from nonvolatile memory 420 is requested, CPU 405 of portable phone 41 determines whether the selected data or program is obtained through a network. When it is determined that the selected data or program has been obtained through a network, the operation shown in FIG. 18 is started.

As shown in the figure, CPU 405 transmits to UIM 51 inserted in portable phone 41 a message to be encrypted and an encryption request for encrypting the message using a private key for the owner of UIM 51 (Step 801). CPU 505 of UIM 51, upon receiving the message and the encryption request, reads a private key for the owner of the UIM 51 and encrypts the message using the private key (step S802). Then, CPU 405 transmits to portable phone 41 the encrypted message (Step S803).

CPU 405 of portable phone 41, upon receiving the encrypted message, decrypts the message using a public key stored in nonvolatile memory 420 in association with the content selected by the user (Step S804) to determine whether the message is decrypted correctly (Step S805).

According to the determination in Step S805, it is possible to determine whether UIM 50 presently inserted in portable phone 41 is the UIM 51 inserted in portable phone 41 at the time of downloading the content which the present user of phone 41 wishes to use; in other words, it is possible to determine whether the user trying to use the content using portable phone 41 is the one who has downloaded the content and also who has been given a permission to use the content from content server 10.

In the case that the message is not decrypted correctly (Step S805: No), i.e., in the case that UIM 51 presently inserted in portable phone 41 is not the one inserted in phone 41 at the time of downloading the content, it is determined that the user does not have a permission to use the content. Thus, CPU 405 of phone 41 displays on its display screen a message informing the user that the content cannot be used (Step S806). Accordingly, CPU 405 cancels the execution of the reading operation.

On the other hand, in the case that the message is decrypted correctly (Step S805: Yes), i.e., in the case that UIM 51 presently inserted in portable phone 41 is the one which was inserted in phone 41 at the time of downloading the content, CPU permits access to the content (Step S807) and reads the content from nonvolatile memory 420 (Step S808). Subsequently, CPU 405 displays the content on a display screen when the content read from nonvolatile memory 420 is image data or movie data. In the case that the content is music data, CPU 405 performs a replaying operation of the music data. In the case that the content is a program, CPU 405 starts a process according to the program.

As shown in the foregoing description, according to the third embodiment, portable phone 41 is enabled to restrict access to content stored in nonvolatile memory 420 to those who has downloaded the content using portable phone 41 and has been given a permission to use the content.

Furthermore, according to the third embodiment, portable phone 41 stores the downloaded content in nonvolatile memory 420 in association with a public key for the owner of a presently inserted UIM 51, the public key having been obtained from the UIM 51. Also, when a request is made for access to content stored in nonvolatile memory 420, portable phone 41 does not obtain a public key or a private key themselves from a UIM 51 presently inserted in phone 40 but requests the UIM 51 to encrypt a message using a private key to verify UIM 51 using a public key which is stored in association with the content to which access is requested.

Thus, a private key used for authenticating the owner of UIM 51 is never output to an external device, and therefore, users are provided with a communication environment with high security. Especially in the case that UIM 51 is a type of a module which exchanges data with portable phone 41 through wireless communication, authentication information such as a private key, password, and the like could be fraudulently stolen by a third party if such authentication information itself is transmitted from phone 41 to UIM 50. However, a method in the third embodiment prevents such a problem before it happens.

Modification of Third Embodiment

In portable phone 41, downloading and storing of content in nonvolatile memory 420 usually requires only one time operation unless a writing error happens or stored content is mistakenly deleted from nonvolatile memory 420. To the contrary, a reading operation for reading content stored in nonvolatile memory 420 could be performed many times since the number of reading operation corresponds to a frequency at which content is used.

Thus, the following reading control operation may be performed to reduce, as much as possible, the number of times authentication information itself of the owner of UIM 51 is output to an external device so as to ensure secure communication using portable phone 41 and UIM 51.

We assume in the modification that authentication storage area 504*d* of UIM 51 stores authentication information such as a password, a private key, and the like for authenticating the owner of the UIM 51. It is to be noted that the downloading and storing operation of content performed in portable phone 41 is the same as the writing control operation (refer to FIG. 17) described in the above second embodiment except that authentication information (for example, a password, private key, etc.) obtained from UIM 51 is used instead of a public key.

Figure 19:
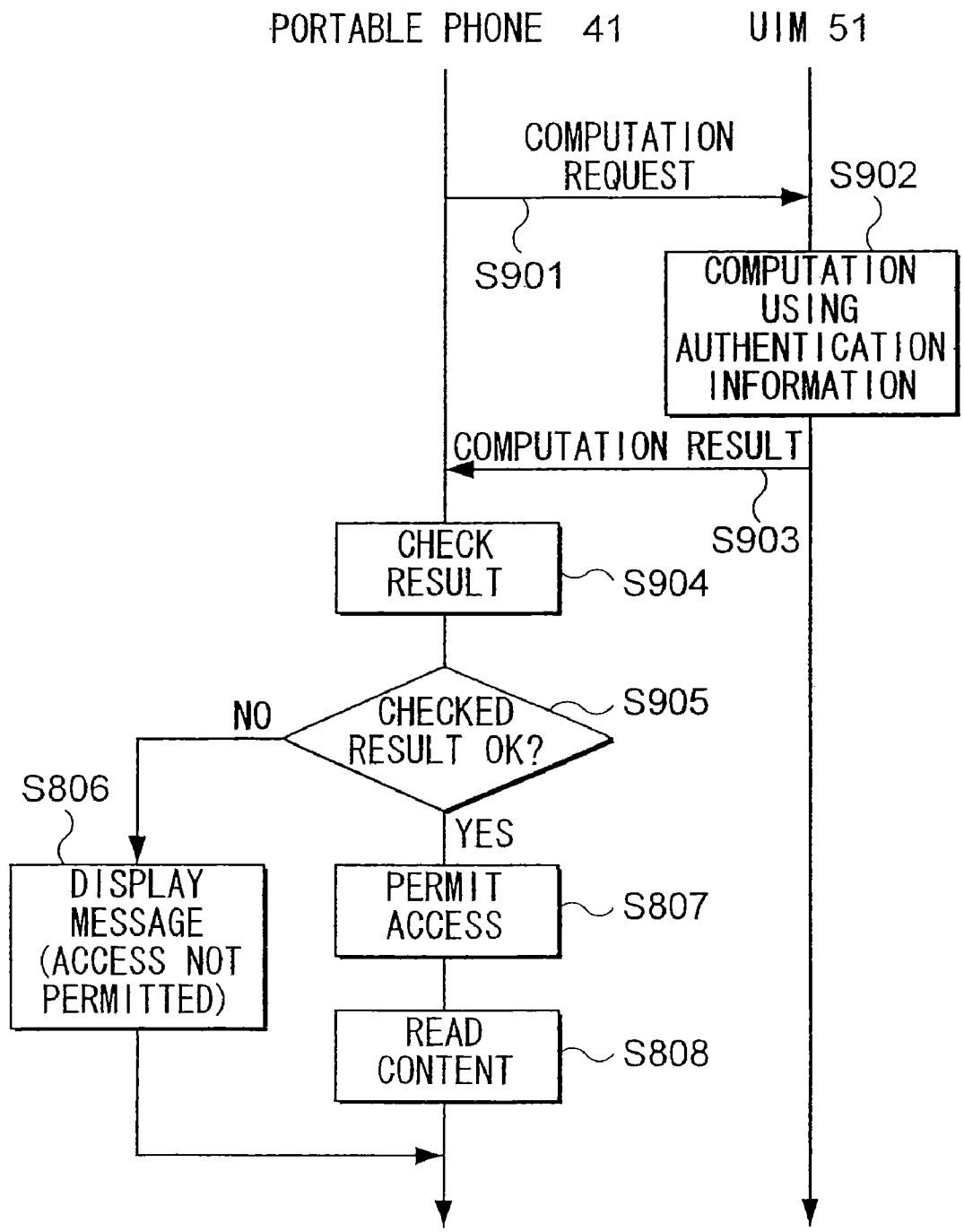
FIG. 19 is a sequence chart showing operations of portable phone 41 and UIM 51 according to a modification of the third embodiment.

FIG. 19 shows an operation in reading content stored in nonvolatile memory 420. It is to be noted that in a sequence chart shown in FIG. 19, those steps different from the sequence chart of FIG. 18 are assigned 900s step numbers. Also, for steps in which the same operations as the sequence chart of FIG. 18 are performed, an explanation thereof will be simplified.

A user first operates a portable phone 41 in which his/her own UIM 51 is inserted, to display a list of data or programs stored in nonvolatile memory 420. The user then selects, from among the listed data or programs on the screen, data or a program to use, for example by an operation input. When a reading operation of the selected data or program from nonvolatile memory 420 is requested, CPU 405 of portable phone 41 determines whether the selected data or program was obtained through a network. When it is determined that the selected data or program is obtained through a network, the operation shown in FIG. 19 is started.

As shown in the figure, CPU 405 transmits to UIM 51, a computing request for requesting UIM 51 to perform a predetermined computation using authentication information of the owner of UIM 51 (Step S901). In EEPROM 504 of UIM 51, an algorithm is stored in advance, according to which algorithm a computation is performed by assigning authentication information to a variable of the algorithm. CPU 505 of UIM 51, upon receiving the computing request, reads from EEPROM 504 the algorithm and performs a computation by substituting authentication information into the algorithm, the authentication information having been read from authentication information storage area 504*d* (step S902). CPU 505 then transmits a computation result to portable phone 41 (Step S903).

It is to be noted that an algorithm does not have to be stored in advance in EEPROM 504 of UIM 51 but may sent from portable phone 41 together with the computing request. Also, it is possible to store a plurality of algorithms, and to include, in the computing request transmitted from portable phone 41, information specifying which algorithm to be used from among the above plurality of algorithms.

CPU 405 of portable phone 41, upon receiving the computation result from UIM 51, determines whether UIM 51 presently inserted in phone 41 is the one inserted in phone 41 at the time of downloading the content which the present user of phone 41 desires to use, on the basis of the computation result, authentication information stored in nonvolatile memory 420 in association with the desired content, and the algorithm used by UIM 51 (Step S904). In other words, it is verified whether the user trying to access content using portable phone 41 is the user who has downloaded the content and also is the user who has been given a permission to use the content.

In more detail, in Step S904, the determination is made, for example, by obtaining authentication information by using the computation result transmitted from UIM 51 and the algorithm used by UIM 51. CPU 405 then compares the obtained authentication information to authentication information associated with the desired content to see if they agree with each other. Alternatively, CPU 405 substitutes the authentication information in association with the desired content into the algorithm used by the user, to see whether the computation result received from UIM 51 and the computation result performed by CPU 405 agree with each other.

In the case that the above two sets of authentication information or computation results do not agree with each other and it is determined that UIM 51 presently inserted in portable phone 41 is not the one inserted in phone 41 at the time of downloading the desired content (Step S905: No), CPU 405 determines that the present user of phone 41 does not have a permission to use the content and displays on a display screen of phone 41 a message informing the user that the content cannot be used (Step S806). Accordingly, CPU 405 cancels the execution of the reading request.

In the case that the above two sets of authentication information or computation results agree with each other and it is determined that UIM 51 presently inserted in portable phone 41 is the one which was inserted in phone 41 at the time of downloading the desired content (Step S905: Yes), CPU 405 permits access to the content (Step S807) and reads the content from nonvolatile memory 420 (Step S808).

According to the modification, authentication information itself such as a password, private key and the like is not transmitted from UIM 51 to portable phone 41 when a request is made for the access to a highly used content although the authentication information is transmitted when storing a downloaded content in nonvolatile memory 420. Specifically, a computing request is transmitted to UIM 51 using authentication information, and a result of the computation, after being returned from UIM 51 to portable phone 41, is compared to authentication information stored in association with the desired content. As a result, security in performing communication using portable phone 41 and UIM 51 is enhanced because the method described in the modification enables the minimization of the frequency of outputting to an external device authentication information itself of the owner of UIM 51.

Further, in the present embodiment, a private/public key pair of the owner of UIM 51 is used to determine whether UIM 51 presently inserted in portable phone 41 is the one which was inserted in phone 41 at the time of downloading the content. In making the determination, a UIMID may also be used in addition to a private/public key pair. In this case, portable phone 41 stores a downloaded content in nonvolatile memory 420 in association with a UIMID of UIM 51 presently inserted in phone 41 and a public key. When a request is made for reading of the content from nonvolatile memory 420, verification using a public key is performed; and in addition, it is determined whether a UIMID of UIM 51 presently inserted in phone 41 agrees with a UIMID which is associated with the requested content.

D. Fourth Embodiment

Next, a description will be given on a fourth embodiment of the present invention with reference to FIGS. 1, 8, 11, and also FIGS. 20 and 21. In this embodiment, the configurations of communication network 1, portable phone 41, and UIM 51 are the same as those of the second embodiment, so an explanation on the same portions as the second embodiment will be omitted.

In the present embodiment, content server 10 is enabled to specify whether to restrict access to a particular content only to the owner of a downloading UIM 51. According to access restriction information provided by content server 10, it is first determined in portable phone 41 whether content access is restricted, and for content to which access is restricted to the owner of a downloading UIM 51, the reading control operation as shown in the second or third embodiment is performed. In the following description, it is assumed that access restriction by content server 10 is performed with respect to Java APs.

FIG. 20 is a diagram illustrating a data configuration of ADF (Application Descriptor File) of a Java AP according to the present embodiment. As described before, ADF is a text file in which there are described various control information for controlling installment or activation of JAR files, network access, and the like. As shown in the figure, the column under "Item Name" includes names for different types of control information, and the column under "Mandatory/Optional" shows whether a corresponding control information is mandatory to be included in ADF or is only optional.

To give a brief description on different types of control information, "AppName" is the name of a Java AP; "AppVer" is a version of a Java AP; "PackageURL" is a URL (Universal Resource Locator) showing the origin of a JAR file; "AppSize" is the data size of a JAR file; and "Spsize" is the size of a scratch pad used by a Java AP.

"AppUser" is control information which designates whether to restrict access to a Java AP only to the owner of UIM 51 inserted in portable phone 41 at the time of downloading the Java AP. In the present embodiment, "AppUser" includes a value "1" or "0," the value "1" designating that the access to a Java AP is restricted only to the owner of UIM 51 inserted in portable phone 41 at the time of downloading the Java AP. On the other hand, the value "0" designates that any user is permitted to use a Java AP.

The value of AppUser is set by content server 10 which is the provider of a Java AP. In other words, content server 10 is enabled to set in AppUser of ADF whether to restrict access to a providing content to particular users or not. For example, in the case that content server 10 wishes to have many users to use a Java AP for free of charge, AppUser of the ADF of the content can be set to "0." On the other hand, for a Java AP for which content server 10 wishes to collect usage charges, AppUser of the ADF of the Java AP can be set to "1."

Figure 21:
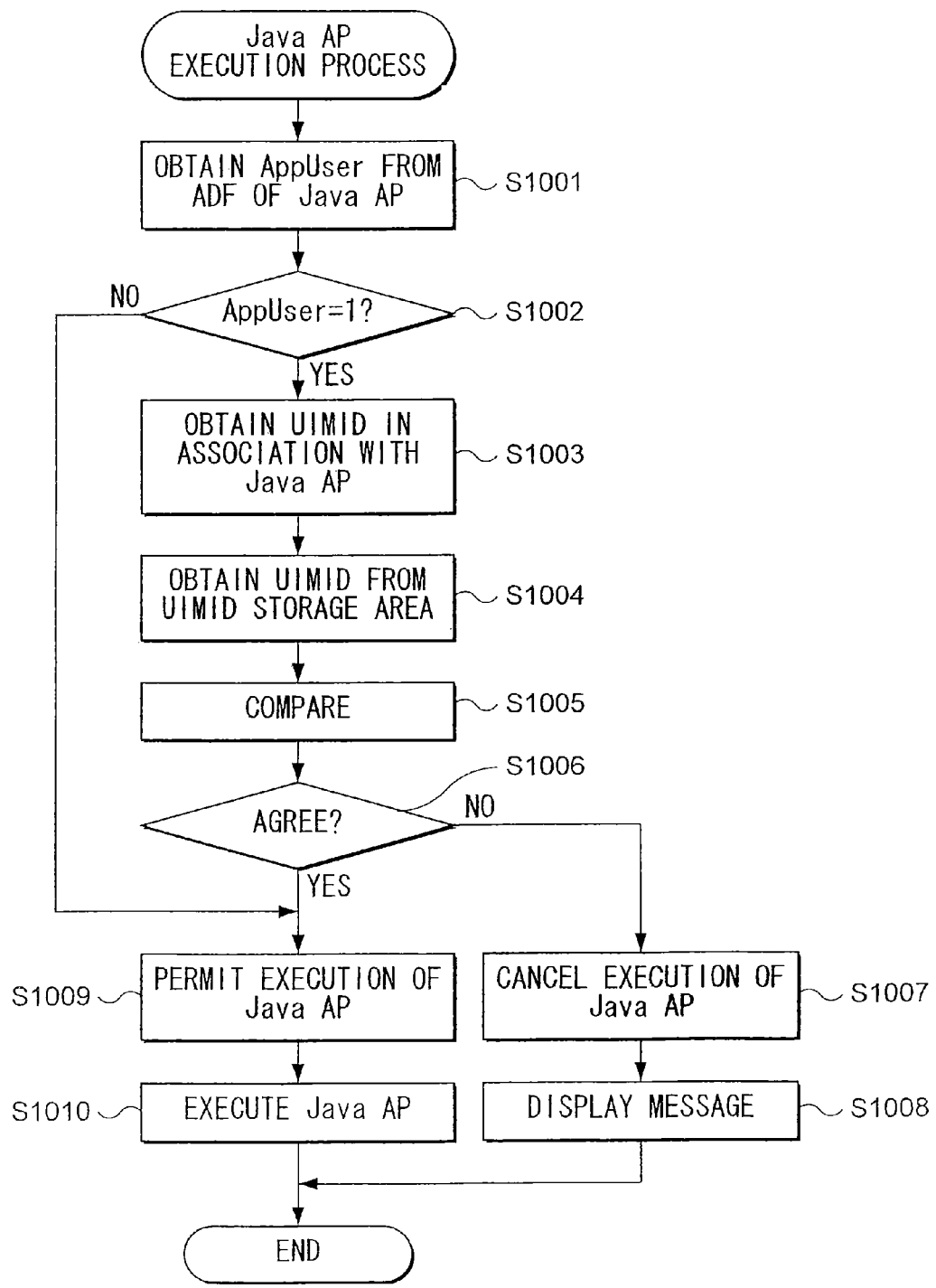
FIG. 21 is a flow chart showing a Java application execution process performed by CPU 405 of a portable phone 41 according to the fourth embodiment.

FIG. 21 is a flow chart showing a process of controlling the execution of a Java AP according to the present embodiment. The operation shown in the figure is performed through JAM by CPU 405 when an operation instruction for instructing the execution of a Java AP is inputted to portable phone 41.

As shown in the figure, CPU 405 reads from content storage area 410c an ADF of the Java AP to be executed, and obtains the value of AppUser (Step S1001). Subsequently, CPU 405 determines whether the obtained value is "1," i.e., whether the access to the Java AP is to be restricted to the owner of a UIM 51 which was inserted in portable phone 41 at the time of downloading the Java AP (Step S1002).

In the case that the value of AppUser is "1" (Step S1002: Yes), the process from Steps S1003 to S1010 are performed, which are the same as Steps S601 to S608 of FIG. 14.

In summary, CPU 405 compares a UIMID stored in content storage area 410c in association with the Java AP to be executed, to a UIMID stored in UIMID storage area 410a, thereby determining whether a present user of portable phone 41 who is instructing the execution of the Java AP is the one who has downloaded the Java AP from content server 10. The Java AP is executed when the compared UIMIDs agree with each other.

In the case that the value of AppUser is "0" (Step S1002: No), the content may be used by any user, and therefore, the routine proceeds to Step S1009 in which CPU 405 permits the execution of the Java AP. Accordingly, the Java AP is activated (Step S1010), and the operation according to the program is started.

It is to be noted that as shown in FIG. 20 AppUser is optional information in an ADF. There may be a case where in obtaining the value of AppUser in Step S1001 of FIG. 21, AppUser may not be included in the ADP. In the case of detecting that AppUser is not included in an ADF, CPU405 performs the process on and after Step S1003 assuming that the value of AppUser is "1" for protecting a right relating to access permission of a Java AP. In other words, in the case that AppUser is not included in an ADF of a Java AP, the access to the Java AP is restricted to the owner of a UIM 51 inserted in portable phone 41 at the time of downloading the Java.

As described above, according to the present embodiment, portable phone 41 is enabled to decide on the basis of AppUser included in an ADF whether to restrict the access to a Java AP downloaded from content server 10 to the owner of a UIM 51 inserted in phone 41 at the time of downloading the Java AP. Thus, a content server is enabled to readily set a access restriction of a Java AP provided by the same content server.

E. Fifth Embodiment

Figure 24:
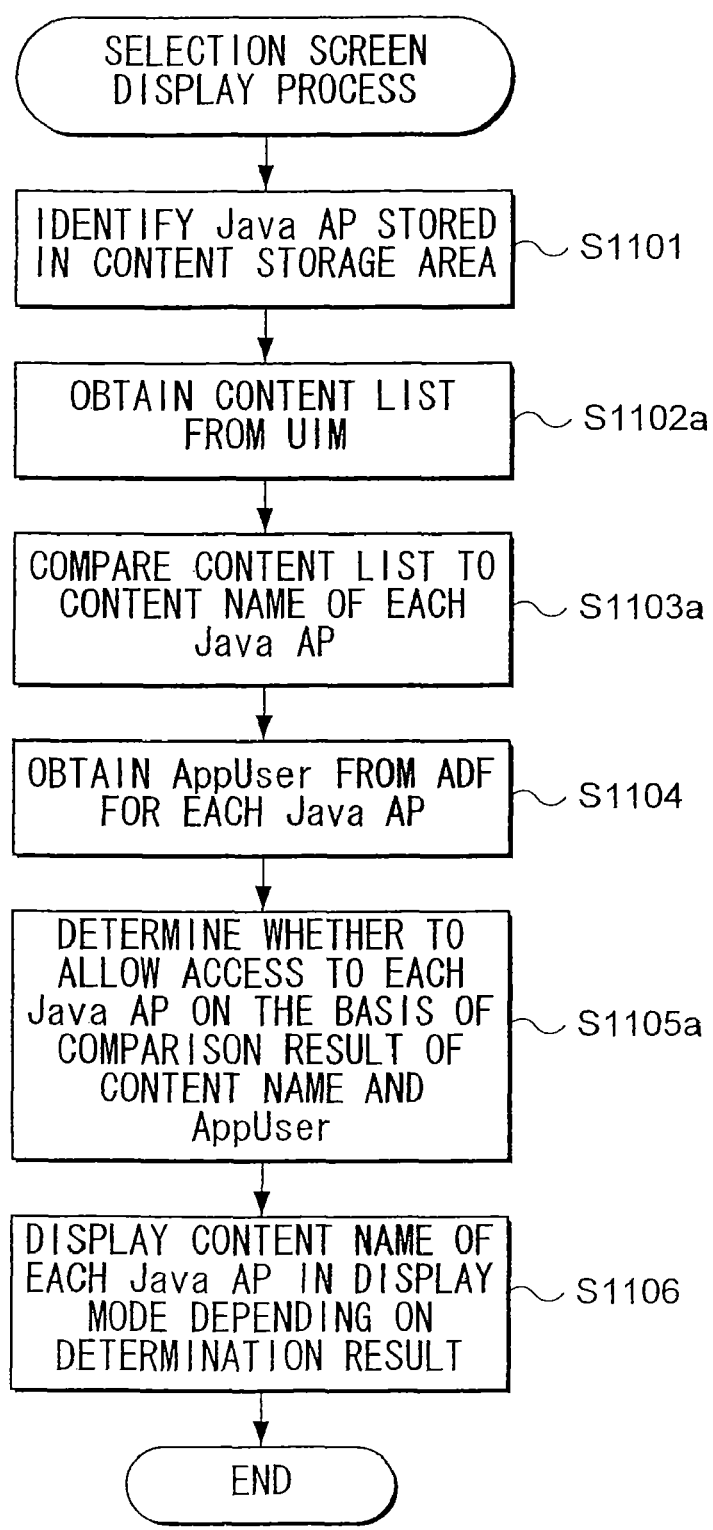
FIG. 24 is a flow chart showing a selection screen display process using a content list, the process being performed by CPU 405 of portable phone 41 according to the fifth embodiment.

Next, a fifth embodiment will be described with reference to FIGS. 1, 8, 11, and also FIGS. 22 to 24. In the above first to fourth embodiments, a user using portable phone 40, 41 with his/her UIM 50, 51 inserted in phone 40, 41 is able to know which content s/he is allowed to access only after instructing the execution of a desired content by an operation input. In the present embodiment, description will be given on a method to effect portable phone 41 to recognize content that can be accessed by a user before the user instructs the execution of the content(s). The hardware configurations of a portable phone 41, a UIM 51 with respect to the present embodiment are the same as those of the second embodiment, and therefore, an explanation thereof will be omitted.

In the case that a user wishes to use a Java AP which has been downloaded and stored in portable phone 41, the user, by an operation input, instructs the display of a selection screen (such as shown in FIG. 23) of a Java APs on the display screen of phone 41. In response to the operation input, CPU 405 of portable phone 41 performs the process shown in a flow chart of FIG. 22. It is to be noted that content listed on the selection screen is not limited to Java APs but may include other content such as an application program, image data, movie data, music data and the like if downloaded from content server 10.

As shown in the flow chart, CPU 405 of portable phone 41 first identifies a Java AP(s) stored in content storage area 410c (Step S1101), and obtains the name(s) of content such as the file name of a JAR (Java Archive) file(s) with respect to the identified Java AP(s). Subsequently, CPU 405 obtains a UIMID stored in UIMID storage area 410a i.e., a UIMID of UIM 51 presently inserted in portable phone 41 (Step S1102).

CPU 405 then compares, for each Java AP identified in the above Step S1101, a UIMID stored in content storage area 410c in association with respective Java AP(s), to the UIMID obtained in Step S1102 (Step S1103). Thus, CPU 405 determines, for each Java AP, whether a user presently using portable phone 41 is the user who has downloaded respective Java AP(s).

Subsequently, CPU 405 obtains for each Java AP the value of AppUser in an ADF of respective Java APs (Step S1104). As described in the fourth embodiment, CPU 405 determines on the basis of the value of AppUser whether the access to a Java AP should be restricted to the owner of UIM 51 inserted in portable phone 41 at the time of downloading respective Java AP(s).

In Step S1105, CPU 405 determines whether the user presently using portable phone 41 is allowed to access to each Java AP on the basis of the result of the determination in Step S1103 and the value of AppUser obtained in Step S1104 (Step S1105). Specifically, in a case that the UIMID obtained in Step S1102 agrees with the UIMID stored in association with a Java AP, or in a case that the value of AppUser obtained for the Java AP is "0," CPU 405 determines to allow access to the Java AP; and in other cases, CPU 405 doses not allow the access to the Java AP. The determination is performed for each of the Java AP(s) identified in Step S1101. It is to be noted that, for non-Java content, the determination on the basis of AppUser is not performed, and whether to allow access to content is determined only on the basis of UIMID; in this case, Step S1104 of the process will be omitted.

Thus, CPU 405 sorts a Java AP(s) stored in content storage area 410c into "access-permitted" and "access-prohibited." The content name(s) of sorted Java AP(s) are displayed on a display screen of portable phone 41 as a selection screen in such a way as shown in FIG. 23 (Step S1106).

In the selection screen shown in FIG. 23, the content names of access-permitted programs are shown in bold characters and those of access-prohibited programs are grayed out (disabled). Preferably, characters and/or background of different colors may be used for respective access-permitted and access-prohibited content names. Alternatively, access-permitted content name(s) may be marked a symbol designating access permission. Still alternatively, the content names of only access-permitted programs may be displayed or may be notified to the user by means of a voice message.

After the selection screen shown in FIG. 23 is displayed on a display screen of portable phone 41, in the case that one of the listed access-permitted programs is selected by a user by an operation input, CPU 405 starts a process according to the selected program. On the other hand, in the case that the user selects one of the access-prohibited programs by an operation input, CPU 405 does not execute the selected program and displays a message informing the user that the access to the selected program is not permitted and that the user has to officially download the program from content server 10 if s/he wishes to use the program. It is to be noted that the owner of portable phone 41 is allowed to delete (i.e., uninstall) a Java AP from content storage area 410c, while the same owner cannot use the same Java AP if s/he is not a permitted user of the Java AP.

As in the foregoing description, in the present embodiment, portable phone 41 used with a removable UIM 51 displays on its display screen a list of programs determined to be access-permitted, from among programs downloaded and stored in phone 41, thereby enabling a user to know programs that are allowed for his/her access before the user instructs the execution of respective programs.

Figure 22:
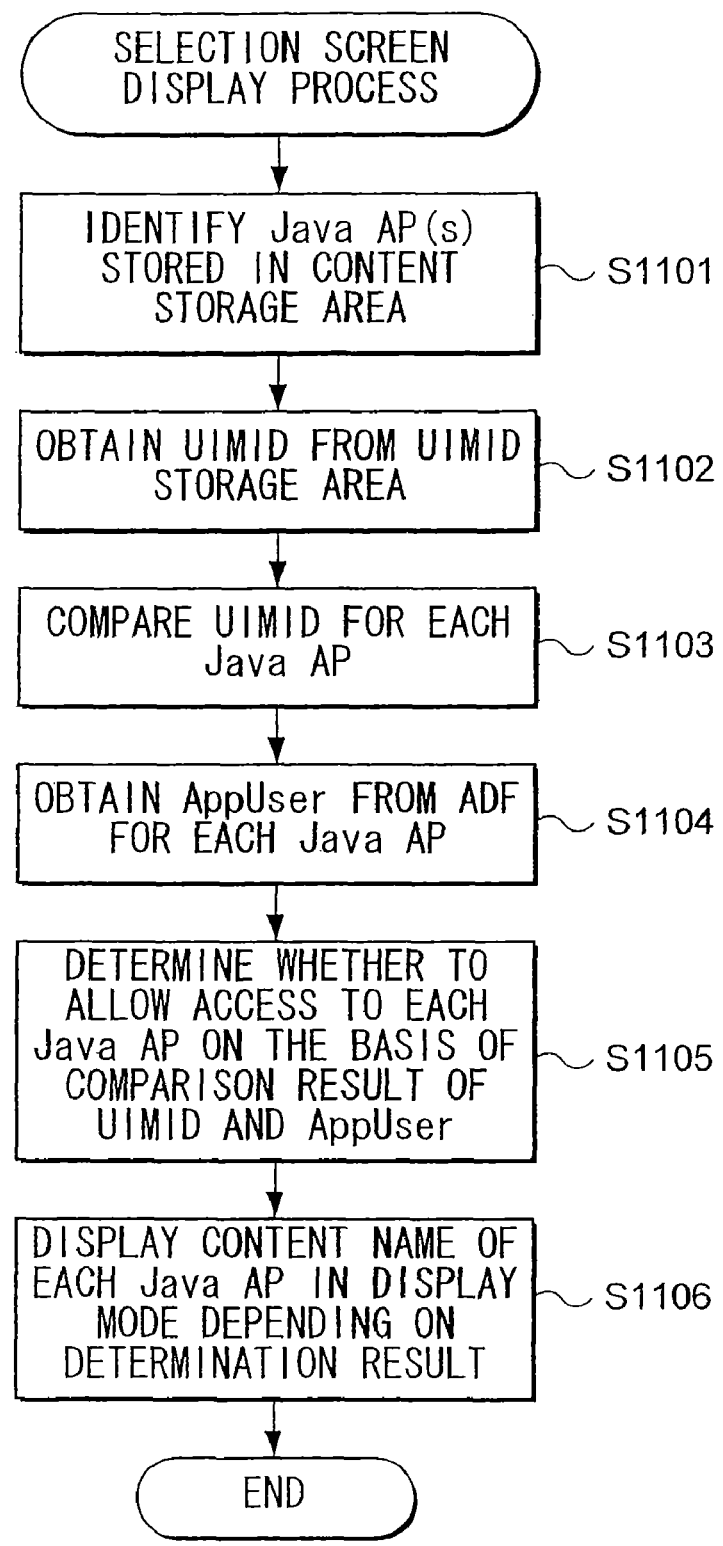
FIG. 22 is a diagram showing a selection screen display process using UIMID, the process being performed by CPU 405 of portable phone 41 according to a fifth embodiment of the present invention.

In the process of displaying a selection screen as shown in the flow chart of FIG. 22, UIMID and AppUser are used as the basis of the determination as to whether a Java AP is access-permitted. However, a content list stored in content list storage area 504e of UIM 51 may be used instead of UIMID. In the following, a description will be given, with reference to FIG. 24, on a process of determining whether to permit access to a Java AP using the content list. It is to be noted that like steps are assigned the same reference numerals as FIG. 22, and an explanation thereof will be simplified.

After identifying a Java AP(s) stored in content storage area 410c in Step S1101 and obtaining the content name of each identified Java AP, CPU 405 of portable phone 41 performs communication with UIM 51 through UIM interface 404 and obtains a content list stored in content list storage area 504e of UIM 51 (Step S1102a). As described in the second embodiment, the content list is a list of content downloaded by the owner of UIM 51 using a portable phone 41 in which his/her UIM 51 is inserted.

Subsequently, CPU 405 compares the content names of the identified Java AP(s) to the content list obtained in Step S1102a (Step S1103a). According to the comparison, CPU 405 is able to determine, for each Java AP, whether a user presently using portable phone 41 is the one who has downloaded respective Java APs.

CPU 405 then, for each Java AP identified in Step S1101, obtains the value of AppUser in an ADF of respective Java APs (Step S1104). CPU 405 determines whether the user presently using portable phone 41 is allowed to use each Java AP on the basis of the result of the determination in Step S1103a and the value of AppUser obtained in Step S1104 (Step S1105a). Specifically, CPU 405 determines to allow access to a Java AP in the case that the content name of the Java AP is found in the content list obtained from UIM 51, and or in the case that the value of AppUser obtained for the Java AP is "0,"; and in other cases, CPU 405 dose not allow the access to the Java AP. The determination is performed for each of the Java AP(s) identified in Step S1101. It is noted also in the process of FIG. 24, that, for non-Java content, the determination on the basis of AppUser is not performed as in the process of FIG. 22.

Thus, CPU 405 sorts a Java AP(s) stored in content storage area 410c into "access-permitted" and "access-prohibited." The content name(s) of the sorted Java AP(s) are displayed on a display screen of portable phone 41 as a selection screen in such a way as shown in FIG. 23 (Step S1106). Thus, the content list stored in content list storage area 504e of UIM 51 may be used in determining whether to allow the present user of phone 41 to use content stored in phone 41.

F. Sixth Embodiment

A sixth embodiment of the present invention will be described with reference to FIGS. 1, 8, 11, and 25. The configurations of communication system 1, portable phone 41 and UIM 51 of the present embodiment are the same as those of the second embodiment, and therefore, an explanation thereof will be omitted.

In the present embodiment, it is assumed that a user changes a UIM 51 to a new one for a reason such as an imperfect operation (technical malfunctioning) of the device, a replacement to a new device, or the like. When such a situation arises, a communication device (portable phone 40, 41) used in the preceding embodiments does not properly restrict access to a downloaded content because UIMID of UIM 51 was used to determine whether to permit access to content to a present user of phone 40, 41. To solve this problem, portable phone 41 according to the present embodiment is enabled to properly restrict the access to a downloaded content even when a UIM 51 is replaced with a new UIM 51.

When a user of UIM 51 changes the UIM 51 to a new UIM 51, the user first visits a service shop to request for the replacement of UIM 51. A shop attendant concludes a replacement agreement with the user and prepares a replacement UIM 51. The user hands his/her own portable phone 41 and UIM 51 to the shop attendant. In the following description, UIM 51 to be replaced will be referred to as "former UIM 51" and the replacement UIM 51 will be as "new UIM 51" for the sake of simplicity.

The shop attendant, after collecting portable phone 41 and former UIM 51, inserts former UIM 51 into portable phone 41. The attendant then operates portable phone 41 to change phone 41 to a maintenance mode, under which the attendant instructs the execution of an operation of exchanging UIM 51.

Figure 25:
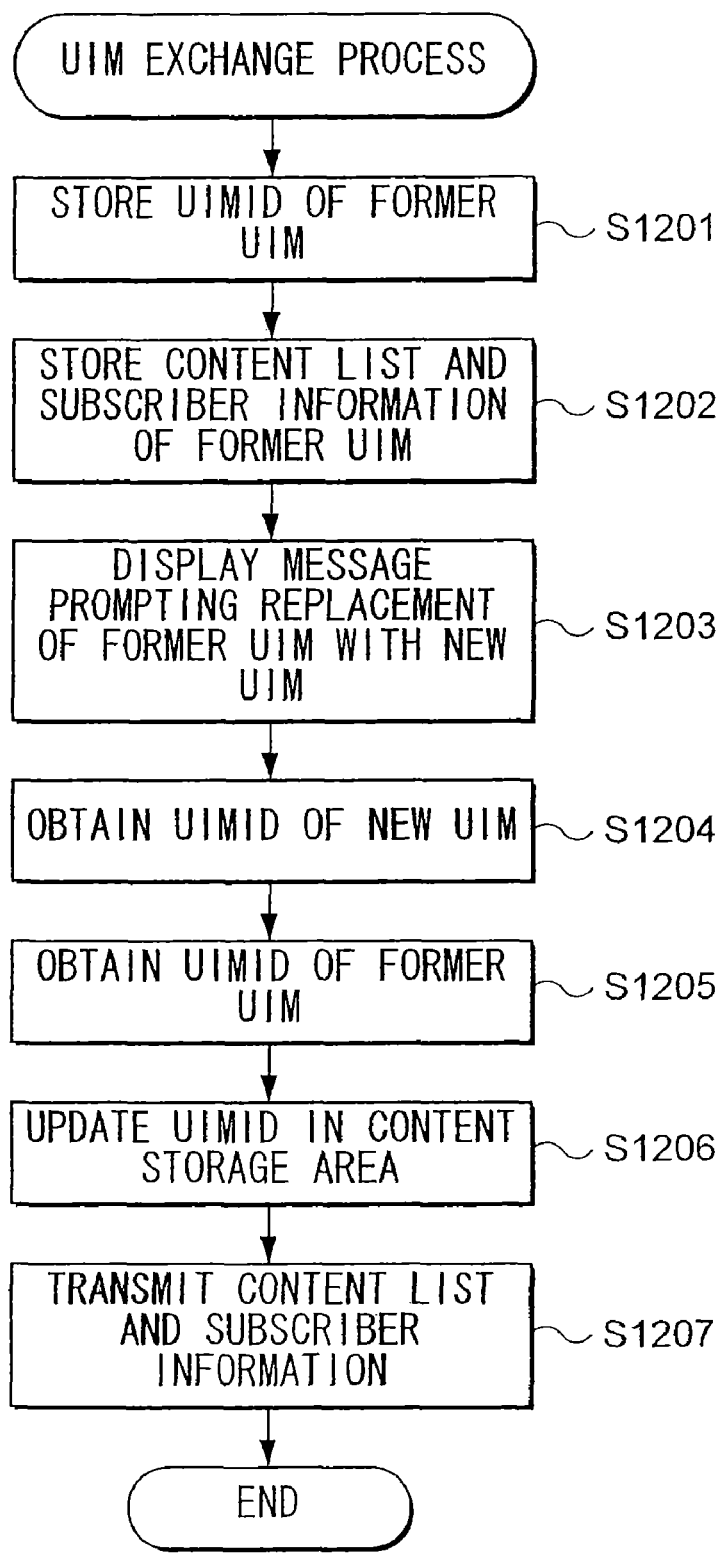
FIG. 25 is a flow chart showing a UIM exchange process performed by CPU 405 of portable phone 41 according to a sixth embodiment of the present invention.

FIG. 25 is a flow chart illustrating a process performed by CPU 405 of portable phone 41 for exchanging UIM 51. As shown in the flow chart, CPU 405 first obtains a UIMID stored in UIMID storage area 410a, the UIMID being that of former UIM 51 which is presently inserted in portable phone 41, and stores the obtained UIMID in nonvolatile memory 420 (Step S1201). In addition, CPU 405 obtains from former UIM 51 a content list stored in content list storage area 504e and subscriber information stored in subscriber information area 504a for storage into nonvolatile memory 420 (Step S1202).

Subsequently, CPU 405 displays a message on its display screen to prompt the shop attendant to turn off portable phone 41, and turn it on after replacing former UIM 51 with new UIM 51 (Step S1203). When the shop attendant, according to the instruction in the message, turns off portable phone 41 and turns it on after replacing former UIM 51 with new UIM 51, CPU 405 obtains a UIMID stored in UIMID storage area 410a (Step S1204). It is noted that, when new UIM 51 is inserted into portable phone 41, UIMID of new UIM 51 is transmitted from UIM 51 to phone 41 to be stored in UIMID storage area 410a. Thus, the UIMID obtained in Step S1204 is the UIMID of new UIM 51.

Next, CPU 405 reads the UIMID of former UIM 51 stored in nonvolatile memory 420 in Step 1201, and rewrites the UIMID of former UIM 51 to the UIMID of new UIM 51 with respect to respective UIMIDs stored in content storage area 410c in association with content (Step S1206).

Further, CPU 405 reads the content list and subscriber information of former UIM51 stored in nonvolatile memory in Step S1202, for transmission to new UIM 51 through UIM interface 404 (Step S1207). CPU 505 of new UIM 51, upon receiving data of the content list and subscriber information of former UIM 51, stores the received data in EEPROM 504 and transmits a storage completion notification to portable phone 41. The operation of exchanging UIM51 is thus completed, and the shop attendant returns portable phone 41 and new UIM 51 to the user.

As described above, according to the present embodiment, when former UIM 51 is replaced with new UIM 51, portable phone 41 updates respective UIMIDs in association with content downloaded from content server 50 from UIMID of former UIM 51 to that of new UIM 51. Thus, a user is enabled to continue to use content downloaded using former UIM 51 after former UIM 51 is replaced with new UIM 51.

It is to be noted that in the present embodiment, only a shop attendant may perform the operation of exchanging UIM 51. This is to prevent the content list and subscriber information stored in UIM 51 from being fraudulently copied to the third person's UIM 51. However, a user may perform the exchanging operation for him/herself, if an identity verification function is incorporated in portable phone 41.

Further, the UIM exchanging operation may be activated in such a way as is described in the following. After the shop attendant collects former UIM 51 and portable phone 41 from the user, the attendant transmits, to a service management center (not shown) of a communication carrier managing mobile packet communication network 30, data of a replacement agreement including the UIMIDs of former UIM 51 and new UIM 51, through a communication terminal installed in the service shop. The shop attendant also inserts former UIM 51 into portable phone 41.

The service management center confirms the details of the agreement transmitted from the service shop, and transmits an activation command instructing the activation of the UIM exchanging operation to portable phone 41 in which former UIM 51 is inserted. CPU 405 of portable phone 41, upon receiving the activation command through radio communication unit 401, activates the UIM exchanging operation according to the activation command. Thus, the UIM exchanging operation is not activated unless portable phone 41 receives the activation command from the service management center, thereby minimizing the occurrence of an undesired UIM exchanging operation being fraudulently performed by a third person.

G. Seventh Embodiment

In the present embodiment, description will be given also on a case where UIM 51 is exchanged as in the sixth embodiment.

Figure 26:
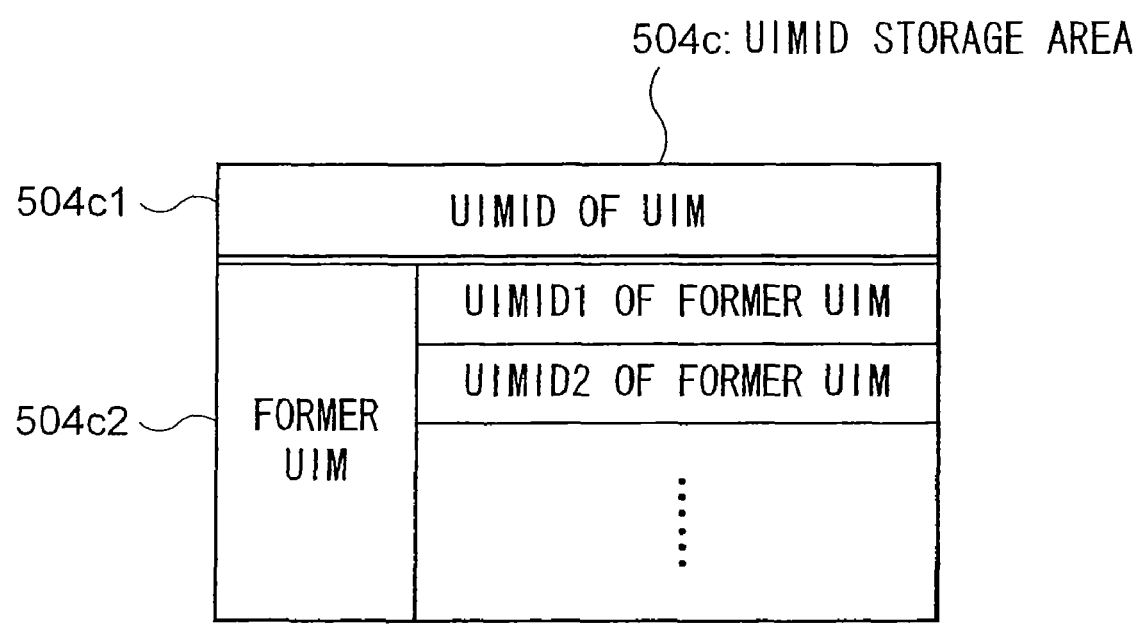
FIG. 26 is a diagram illustrating a data configuration of a UIMID storage area 504c in EEPROM 504 according to a seventh embodiment of the present invention.

In UIM 51 according to the present embodiment, UIMID storage area 504*c* provided in EEPROM 504 has, as shown in FIG. 26, an area 504*c*1 for storing a UIMID assigned to the UIM 51 itself and an area 504*c*2 for storing a plurality of UIMIDs of one or a plurality of former UIM(s) 51.

Stored in area 504*c*1 is a UIMID of UIM 51 which is written into UIM 51 at the time of shipment from a factory or at the time when a service agreement of a communication service is entered by a user. Stored in area 504*c*2 is a UIMID stored in UIMID storage area 504*c* of former UIM 51 which is written into new UIM 51 during the UIM exchange operation (refer to FIG. 25) of the above sixth embodiment when a content list and subscriber information stored in former UIM 51 are written into new UIM 51. In a case where a user has renewed more than one UIM 51, data stored in area 504*c*2 should include UIMIDs of a plurality of former UIMs 51 that used to be owned by the user.

Data stored in UIMID storage area 504*c*1 and 504*c*2 is written into UIMID storage area 410*a* of portable phone 41 when UIM 51 is inserted in phone 41. In the case of downloading content from content server 10 as described in the second embodiment (refer to FIG. 13), CPU 405 of portable phone 41 stores the downloaded content in content storage area 410*c* in association with the UIMID stored in area 504*c*1.

In the case of executing a Java AP as described in FIG. 14 of the second embodiment, CPU 405 of portable phone 41 compares a UIMID stored in content storage area 410*c* in association with content to be executed, to one or a plurality of UIMID(s) of UIM 51 presently inserted in phone 41, which one or a plurality of UIMID(s) is stored in UIMID storage area 410*c*. In the case that any of the one or plurality of UIMID(s) agrees with the UIMID which is in association with the content to be executed, access to the Java AP is permitted.

In the case of displaying a list of access-permitted content as described in the above fifth embodiment (refer to FIG. 22), CPU 405 of portable phone 41 determines whether, for each Java AP stored in content storage area 410*c*, a UIMID in association with respective Java APs agrees with any of one or plurality of UIMID(s) stored in UIMID storage area 504*c*. The value of AppUser in an ADF of respective Java APs is also referred to in addition to the determination on the basis of UIMID, thereby determining whether to allow access to respective Java APs.

Thus, as in the above sixth embodiment, according to the present embodiment, it is possible, even in a case that a user replaces his/her UIM 51 with a new UIM 51, for the user to access, using the new UIM, content downloaded using a former UIM and stored in portable phone 41.

H. Modifications

It should be understood that the present invention is not limited to the above embodiments but may be implemented in various other modes without departing from the essential characteristics of the present invention. The above described embodiments are mere examples of the present invention and not restrictive, the scope of the present invention being indicated by the appended claims, and all changes which come within the meaning and the range of equivalency of the claims are therefore intended to be embraced therein. The following are example of such contemplated modifications that further illustrate and teach the invention.

First Modification

In the above embodiments, UIMID is used in restricting access to a downloaded content. The present invention is not limited so, but subscriber identification (ID) stored in subscriber information storage area 504*a* may be used instead of UIMID. In this case, the UIMID exchange operation as described in the sixth and seventh embodiments becomes unnecessary because subscriber ID used in a former UIM 51 is transferred to and used in a new UIM 51.

However, it is not desirable in terms of protecting private information of a user, if subscriber ID such as a telephone number is stored in a memory of another person's portable phone 41. Therefore, it is preferable to use, as subscriber ID used in place of UIMID, an identification unique to a subscriber other than a telephone number, which identification is assigned by a communication carrier of mobile packet communication network 30 to a subscriber of a communication service using UIM 51.

Second Modification

We assume in the second modification that a user owns two UIMs 50*a* and 50*b* in the first embodiment, or UIM 51*a* and 51*b* in the second to seventh embodiments. In the case that the user using UIM 50*b*, 51*b* attempts to use content downloaded by UIM50*a*, 51*b*, access to the content is prohibited even when the user of the two UIMs 50*a* and 50*b*, 51*a* and 51*b* is the same person, since UIMID and subscriber ID are not information identifying a user, but identification information for identifying a communication service contract using UIM 50, 51. Thus, it is necessary for CPU 405 of portable phone 40, 41 to control phone 40, 41 to restrict access and storage of content on a user-to-user basis in the case that a single user owns more than one UIMs.

One way of such a user-based control is to store, in UIMID storage area 504*c*2 (refer to FIG. 26) in one of a plurality of UIMs 50, 51 owned by the same user, a UIMID(s) of the other(s) of the plurality of UIMs 50, 51. In other words, in UIMID storage area 504*c* of a UIM 50, 51, all of the UIMIDs of UIMs 50, 51 owned by the same user are stored. Then, the content access control as described in the seventh embodiment is performed using data of the plurality of UIMIDs stored in UIMID storage area 504*c*. Alternatively, a user ID may be used for controlling access to content by storing the same user ID in each of a plurality of UIMs 50, 51 owned by the same user.

Third Modification

In the above embodiments, when a UIM 50, 51 is inserted in portable phone 40, 41, a UIMID of the inserted UIM 50, 51 is transferred from UIM 50, 51 to phone 40, 41, and stored in UIMID storage area 410*a* of phone 40, 41. Instead, portable phone 40, 41 may obtain a UIMID of the inserted UIM 50, 51 every time when the UIMID is needed, by accessing UIM 50, 51 through UIM interface 404.

Fourth Modification

In some of the above embodiments, Java AP is shown as an example of content received by portable phone 40, 41, but the present invention is not limited thereto. Content according to the present invention includes not only Java application programs but also non-Java application programs, image data, music data, movie data, and the like. Thus, it is especially to be noted that the above second, fourth to seventh embodiments described taking a Java AP as an example of content may also be applied to other types of content. In the fifth embodiment, AppUser in an ADF is used for content server 10 to designate whether to restrict access to a Java AP. For non-Java content which does not have an ADF, any type of designator may be assigned by content server 10 as far as a communication device, i.e., UIM 50, 51 is informed in advance what is meant by the designator. Similarly, the first and third embodiments may be applied to a Java AP.

Further, the present invention is not limited to content downloaded from content server 10 in response to a request from a user but also includes content push-delivered from content server 10. Also, a program, not a user of portable phone 40, 41, may request content server 10 to transmit content. Thus, "receiving content from a network" as in the appended claims includes not only downloading content to a communication device in response to a downloading request made by a user of the communication device but also receiving at the communication device content which is push-delivered from a content server in the network or which is transmitted in response to a request from a program running in the communication device.

Further, a plurality of content items may be downloaded from a plurality of nodes in a network in such a case where receiving one complete application program requires receiving a plurality of content items stored in different content servers. Such an example has been given in the second embodiment to describe a case where an ADF and a JAR file of a Java AP are downloaded from different servers. It is to be noted that, also in the other embodiments, a plurality of content items may be downloaded from a plurality of content servers in a network.

Fifth Modification

In each of the above embodiments, content server 10 is connected to the Internet 20. The present invention is not so limited but content server 10 may be connected through an exclusive line to gateway server 31 of mobile packet communication network 30. Further, gateway server 31 itself may have a function of content server 10. Still further, content server 10 may be provided in mobile packet communication network 30.

Sixth Modification

Figure 27:
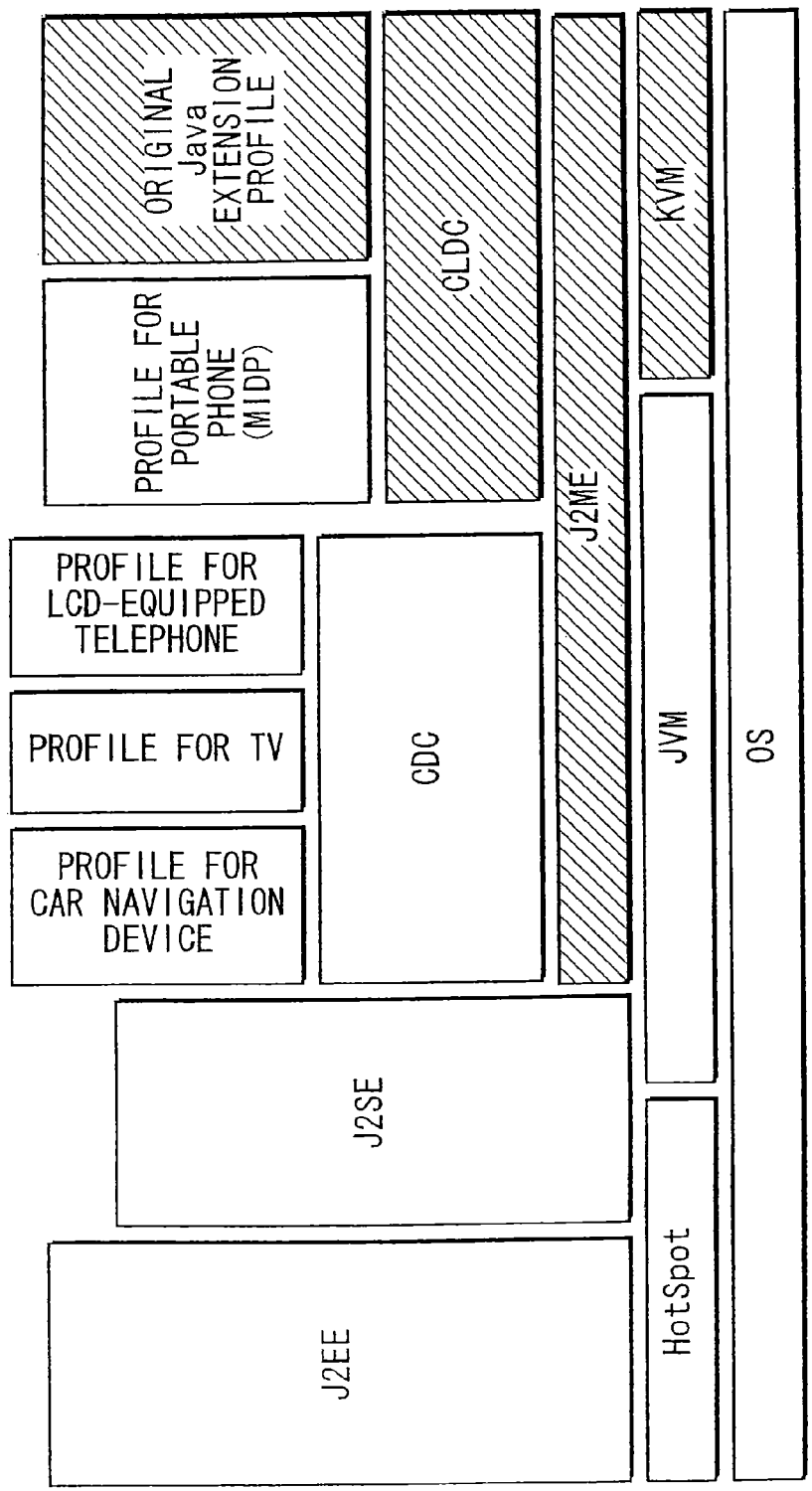
FIG. 27 is a diagram for explaining a possible Java runtime environment to be provided in a portable phone 40, 41 according to a sixth modification of the present invention.

FIG. 27 is a diagram showing a possible architecture of a Java runtime environment provided in a Java-compatible communication device. In some of the above embodiments, KVM and J2ME are used in a Java runtime environment provided in portable phone 41, KVM being a software for the Java runtime environment and J2ME comprising CLDC as a configuration and the original Java Extension Profile as a profile (refer to the hatched portions of FIG. 27). However, the present invention is not limited to a Java runtime environment with a combination of KVM and J2ME.

As shown in FIG. 27, MIDP (Mobile Information Device Profile) may be used as a profile of J2ME instead of the original Java Extension Profile. MIDP is a profile for portable phones developed by JCP (Java Community Process). Also, JVM may be used instead of KVM; and CDC (Connected Device Configuration) may be used instead of CLDC as a configuration of J2ME. Further, the Java runtime environment may comprise a profile for LCD (Liquid Crystal Display)-equipped telephones, a profile for televisions, a profile for car-navigation devices. Still further, HotSpot and J2SE (Java 2 Standard Edition) or J2EE (Java 2 Enterprise Edition) may be provided in the Java runtime environment.

Seventh Modification

In the above embodiments, portable phone 40, 41 has been used as an example of a communication device. However, a "communication device" as in the appended claims also include a personal computer, PDA (Personal Digital Assistant), PHS™ (Personal Handyphone System), and a car-navigation device, and the like.

Eighth Modification

In the above embodiments, portable phone 40, 41 performs an access control or storing control operation of content according to a program stored in ROM 408 or in nonvolatile memory 410, 420, but a program for implementing an operation according to the present embodiment may be provided to portable phone 40, 41 by communication. Further, such a program may be provided to portable phone 40, 41, using a recording medium such as an optical recording medium, magnetic recording medium, semiconductor memory, and the like. It is noted that in this case a recording medium driver need to be provided with portable phone 40, 41.

Ninth Modification

In the above embodiments, UIM 50, 51 may be a contactless IC card which performs data exchanges with portable phone 40, 41 by wireless communication. In other words, a data storage module does not have to be inserted in portable phone 40, 41, but is acceptable if data stored therein can be accessed by a communication device (portable phone 40, 41) via a wireless communication (including an infrared ray communication and optical communication). Also, a data storage module and a communication device may be connected via a communication cable. Thus, a "data storage module connecting to the communication device" as recited in the appended claims includes not only a type of data storage module inserted in the communication device but also a different type of data storage module which is wirelessly connected to the communication device or which is connected to the communication device via a cable.

Further, a data storage module according to the present invention is not limited to one which stores data required for portable phone 40, 41 to perform communication, such as UIM 50, 51. For example, a data storage module may be a memory card, an optical disk, a magnetic disk, and the like, if it is a recording medium removable from portable phone 40, 41.

In the case of using a recording medium instead of UIM 50, 51, there may be a case where data stored in the recording medium is fraudulently copied by a third person. To prevent such a case, a serial number unique to a recording medium may be stored in respective recording media, the serial number being stored in association with the downloaded content in content storage area 410c of portable phone 40, 41.

Figure 28:
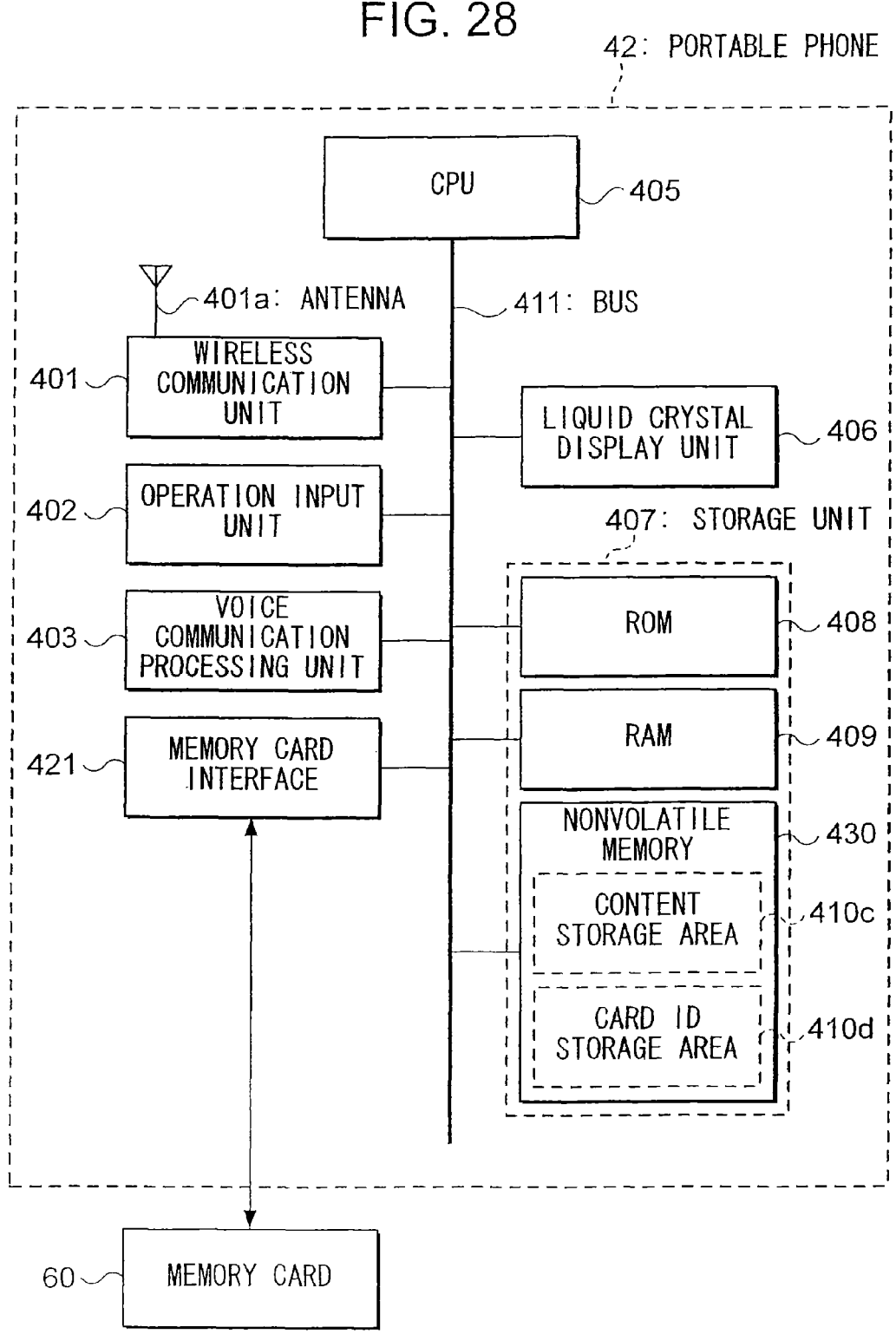
FIG. 28 is a block diagram illustrating a hardware configuration of a portable phone 42 according to a ninth modification of the present invention.

Alternatively, a control operation such as described below may be performed. FIG. 28 is a block diagram illustrating a hardware configuration of a portable phone 42 according to the present modification. As shown in the figure, portable phone 42 differs from portable phone 40, 41 in that a memory card interface 421 is provided instead of UIM interface 404. Further, a card ID storage area 410*d* is provided in nonvolatile memory 430 instead of UIMID storage area 410*a*.

Memory card interface 421 controls writing and reading of data into a memory card 60 inserted in memory card interface 421. In memory card 60, a card ID (for example, a manufacturer's serial number) unique to respective memory cards is stored in advance. Also stored in memory card 60 is a content list including a list of content downloaded by portable phone 42 from content server 10 when the memory card 60 is inserted in phone 42. In card ID 410*d* of nonvolatile memory 430 of phone 42, a card ID of a memory card 60 presently inserted in phone 42 is stored.

Figure 29:
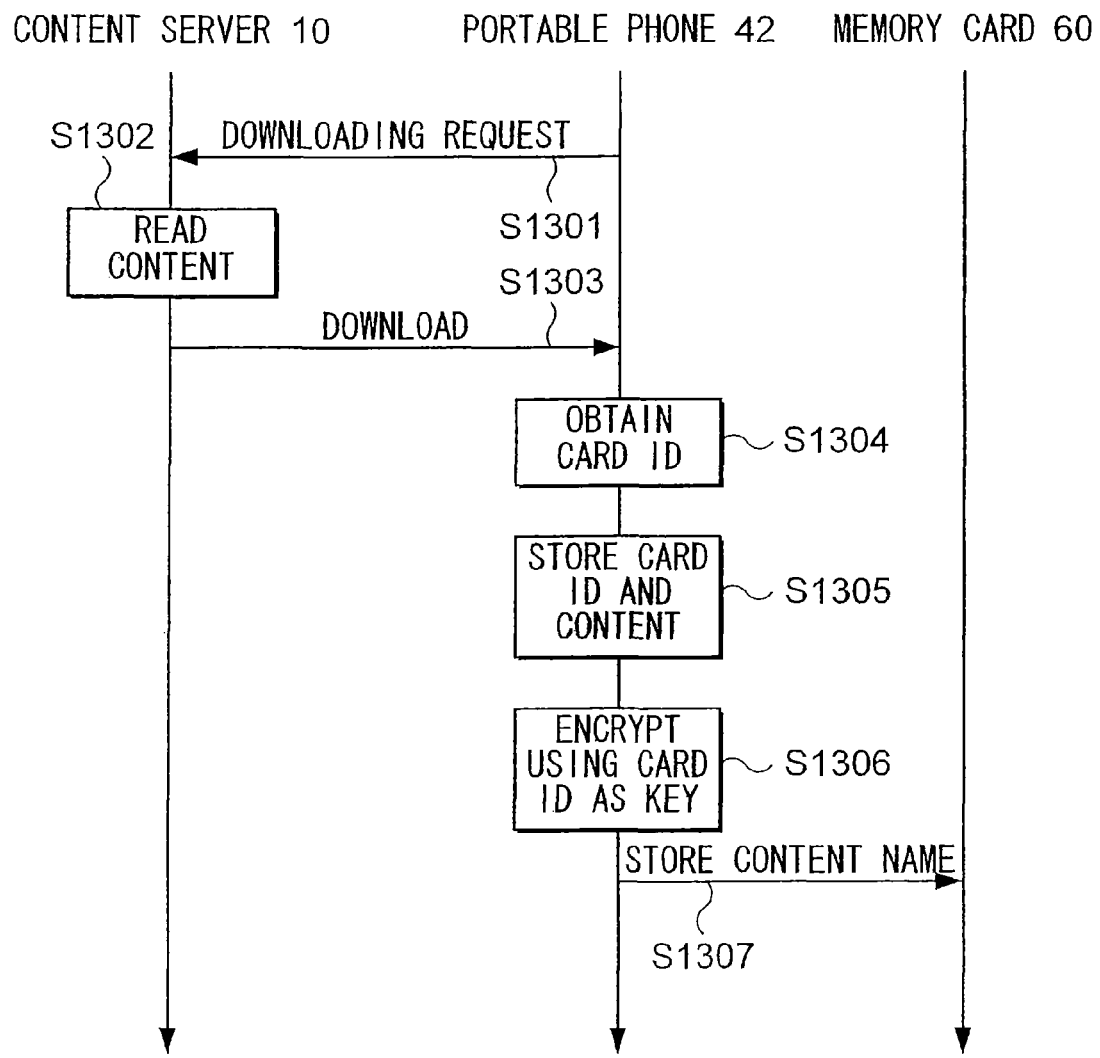
FIG. 29 is a sequence chart showing operations of a content server 10 and portable phone 42 according to the ninth modification.

FIG. 29 is a sequence chart illustrating operations of content server 10, portable phone 42, and memory card 60 when portable phone 42 with memory card 60 inserted therein downloads content from content server 10. First, CPU 405 of portable phone 42 transmits a downloading request to content server 10 through wireless communication unit 401 (Step S1301). Included in the downloading request is a command for instructing a downloading and information specifying content to be downloaded. Content server 10, upon receiving the downloading request, reads the content specified in the downloading request from a memory (Step S1302), and transmits the read content to portable phone 42 (Step S1303).

Subsequently, CPU 405 of portable phone 42 obtains a card ID stored in card ID storage area 410*d*, i.e., a card ID of memory card 60 presently inserted in phone 42 (Step S1304). CPU 405 then stores the obtained card ID in association with the downloaded content (Step S1305).

After storing the card ID and the downloaded content in association with each other, CPU 405 of portable phone 42 obtains identification information of a downloaded content, for example, a file name (content name) of the content. CPU 405 then encrypts the obtained content name using the card ID stored in card ID storage area 410*d* as a key (Step S1306), and has the encrypted content name stored in memory card 60 through memory card interface 421 (Step S1307). Thus, the content name encrypted by the card ID is added to the content list stored in memory card 60.

Figure 30:
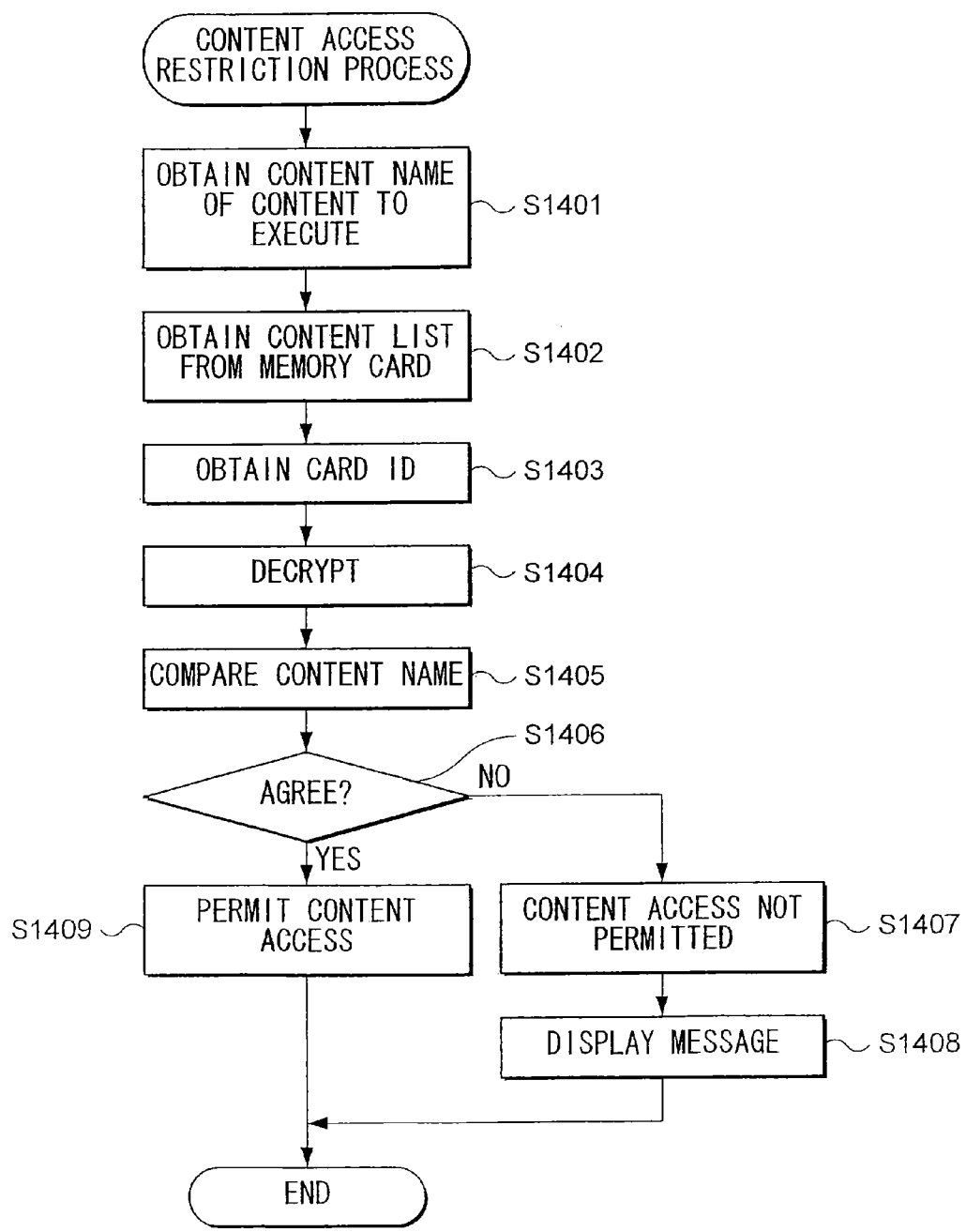
FIG. 30 is a flow chart showing a content access restriction process performed by CPU 405 of portable phone 42 according to the ninth modification.

FIG. 30 is a flow chart illustrating a process of content access control performed by CPU 405 of portable phone 42. The process in the figure is initiated when an operation input is made to specify content stored in content storage area 410*c* to access the content.

CPU 405 first obtains a name of content (e.g. a file name) of content to be executed from content storage area 410*c* (Step S1401). Subsequently, CPU 405 obtains from memory card 60 the encrypted content list (Step S1402) as well as obtaining a card ID stored in card ID storage area 410*c* (Step S1403). CPU 405 then decrypts, using the card ID as a key, each of the content names included in the content list (Step S1404), and stores the decrypted content list in RAM 409.

Subsequently, CPU 405 compares the content name obtained in Step S1501 to each content name included in the content list stored in RAM 409 (Step S1405) to determine whether the content name of the content to be executed agrees with any of the content names included in the content list (Step S1406). Thus, it is possible to determine whether a user instructing access to content using portable phone 42 is the one who has downloaded the content.

In the case that it is determined that the content name of the content to be executed does not agree with any of the content names included in the content list (Step S1406: No), CPU 405 prohibits access to the content (Step S1407) and displays on a display screen a message informing the user that the content cannot be used (Step S1408). Then, the process of restricting the content access is ended.

In the case that it is determined that the content name of the content to be executed agrees with any of the content names included in the content list (Step S1406: Yes), CPU 405 determines that a user instructing the access to the content is the one who has downloaded the content from content server 10 and who has been given permission to access the content, thereby permitting the access to the content (Step S1409). In the case that the content is a program, CPU 405 activates the program to start an operation according to the program. In the case that the content is image data, CPU 405 displays image based on the image data on a display screen.

In the present modification, identification information of content to be stored in memory card 60 is encrypted using a card ID number of memory card 60; encrypted identification information of content is decrypted using a card ID of presently inserted memory card 60 as a key, which encrypted identification information is read from memory card 60. Thus, access control can be performed even when a memory card is used as a data storage module, the memory card, unlike UIM 50, 51, having no internal microprocessor provided therein and having no capacity to perform access control. It should be readily understood that memory card 60 may be a recording medium such as smart card, a floppy disc, CD-ROM (Compact Disc-Rom), DVD (Digital Versatile Disc), and the like.

What is claimed is:

1. A communication terminal comprising:
   a memory and a central processing unit in communication with the memory;
   a receiving unit that receives content; and
   a storing unit that stores the content received by the receiving unit in the memory;
   wherein the central processing unit is executable to store content identification data identifying the content in a data storage module that is a separate and independent device attached to the communication terminal at a time when the content is received, the data storage module comprising a processor and being detachable from the communication terminal;
   the central processing unit further executable, if use of the content stored in the memory is instructed when any data storage module is attached to the communication terminal, to determine whether the content identification data identifying the content matches identification data obtained from the any attached data storage module; and
   the central processing unit further executable to permit use of the content in response to determination by the central processing unit that content identification data identifying the content matches identification data obtained from the any attached data storage module.

2. The communication terminal of claim 1, wherein the central processing unit is further executable to encrypt the content identification data prior to storage in the data storage module.

3. The communication terminal of claim 2, wherein the central processing unit is further executable to encrypt the content identification data using an identifier of the data storage module.

4. The communication terminal of claim 3, wherein the central processing unit is further executable to obtain the identifier from the data storage module prior to encryption of the content identification data.

5. The communication terminal of claim 2, wherein the central processing unit is further executable to retrieve and decrypt the content identification data stored in the any attached data storage module prior to determination by the central processing unit of whether the content identification data identifying the content matches identification data obtained from the any attached data storage module.

6. The communication terminal of claim 5, wherein the central processing unit is executable to obtain an identifier from the any attached data storage module, and decrypt the retrieved content identification data stored in the any attached data storage module using the identifier obtained from the any attached data storage module.

7. The communication terminal of claim 6, wherein the retrieved content identification data stored in the any attached data storage module is included in a list representative of different content received.

8. The communication terminal of claim 1, wherein the central processing unit is further executable to store in the memory in association with the content a unique identifier of the data storage module attached to the communication terminal at a time the content is received.

9. The communication terminal of claim 8, wherein the central processing unit is further executable to report the content as content permitted to be used after confirmation that the unique identifier stored in the memory in association with the content matches a unique identifier of the any data storage module that is attached to the communication terminal.

10. The communication terminal of claim 1, wherein the central processing unit is further executable to delete the content identification data identifying the content in response to the content being deleted from the memory.

11. The communication terminal of claim 1, wherein the central processing unit is further executable to obtain an identifier of the content received by the receiving unit, and transmit the identifier to the data storage module attached to the terminal at a time when the content is received.

12. A communication terminal comprising:
a memory and a central processing unit in communication with the memory;
a receiving unit that receives content; and
a storing unit that stores the content received by the receiving unit in the memory;
wherein the central processing unit is executable to store content identification data identifying the content in a data storage module that is a separate and independent device attached to the communication terminal at a time when the content is received, the data storage module comprising a processor and being detachable from the communication terminal; and
the central processing unit further executable to report the content to a user as content permitted to be used if any data storage module is attached to the communication terminal, and the content stored in the memory matches content identified by content identification data obtained from the attached any data storage module.

13. The communication terminal of claim 12, wherein the central processing unit, prior to allowing use by the communication terminal of the content stored in the memory, is further executable to determine if the content stored in the memory matches content identified by content identification data obtained from the attached any data storage module.

14. The communication terminal of claim 12, wherein the central processing unit is further executable to encrypt the content identification data prior to storage in the data storage module.

15. The communication terminal of claim 14, wherein the central processing unit is further executable to encrypt the content identification data using an identifier of the data storage module.

16. The communication terminal of claim 15, wherein the central processing unit is further executable to obtain the identifier from the data storage module prior to encryption of the content identification data.

17. The communication terminal of claim 14, wherein the central processing unit is further executable to retrieve and decrypt the content identification data stored in the any attached data storage module prior to determination by the central processing unit of whether the content identification data identifying the content matches identification data obtained from the any attached data storage module.

18. The communication terminal of claim 17, wherein the central processing unit is executable to obtain an identifier from the any attached data storage module, and decrypt the retrieved content identification data stored in the any attached data storage module using the identifier obtained from the any attached data storage module.

19. The communication terminal of claim 18, wherein the retrieved content identification data stored in the any attached data storage module is included in a list representative of different content received.

20. The communication terminal of claim 12, wherein the central processing unit is further executable to store in the memory in association with the content a unique identifier of the data storage module attached to the communication terminal at a time the content is received.

21. The communication terminal of claim 20, wherein the processor is further executable to report the content to the user as content permitted to be used after confirmation that the unique identifier stored in the memory in association with the content matches a unique identifier of the any data storage module that is attached to the communication terminal.

22. The communication terminal of claim 12, wherein the central processing unit is further executable to delete the content identification data identifying the content in response to the content being deleted from the memory.

23. The communication terminal of claim 12, wherein the central processing unit is further executable to obtain an identifier of the content received by the receiving unit, and transmit the identifier to the data storage module attached to the terminal at a time when the content is received.

* * * * *